United States Patent
Tanaka et al.

(10) Patent No.: US 7,756,505 B2
(45) Date of Patent: Jul. 13, 2010

(54) SEMICONDUCTOR INTEGRATED CIRCUIT AND A SOFTWARE RADIO DEVICE

(75) Inventors: Hiroshi Tanaka, Kokubunji (JP);
Takanobu Tsunoda, Kokubunji (JP);
Tetsuroo Honmura, Sagamihara (JP);
Manabu Kawabe, Hachioji (JP);
Masashi Takada, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 558 days.

(21) Appl. No.: 11/240,618

(22) Filed: Oct. 3, 2005

(65) Prior Publication Data

US 2006/0073804 A1    Apr. 6, 2006

(30) Foreign Application Priority Data

Oct. 4, 2004    (JP)    .............................. 2004-290890

(51) Int. Cl.
| | |
|---|---|
| *H04B 1/28* | (2006.01) |
| *H04B 1/26* | (2006.01) |
| *H04M 3/00* | (2006.01) |
| *H04M 1/00* | (2006.01) |
| *G06F 7/38* | (2006.01) |
| *G06F 15/00* | (2006.01) |
| *G06F 15/76* | (2006.01) |
| *G06F 9/00* | (2006.01) |
| *G06F 9/44* | (2006.01) |
| *H03K 19/173* | (2006.01) |
| *H03K 19/177* | (2006.01) |
| *H01L 27/10* | (2006.01) |
| *H01L 29/76* | (2006.01) |

(52) U.S. Cl. ....................... 455/333; 455/318; 455/418; 455/552.1; 326/37; 326/38; 326/39; 712/16; 712/226; 712/227; 257/208; 257/390

(58) Field of Classification Search ................. 455/333, 455/452.2, 552.1, 418, 425, 509, 323, 318, 455/334, 552, 553, 319, 423, 552.2, 15, 41.2, 455/118, 147, 165.1, 260, 339, 346, 403, 455/404.1, 411, 412.2, 414.1, 421, 422.1, 455/426.1, 427, 428, 436, 450, 464; 370/310, 370/330; 712/10, 11, 13, 15, 16, 18, 19, 712/20, 1, 22, 28, 14, 226, 227, 245; 375/95, 375/324; 341/51, 107; 257/208, 209, 210, 257/390, 529, 691; 326/37, 38, 39

See application file for complete search history.

(56) References Cited

U.S. PATENT DOCUMENTS 6,654,595 B1 * 11/2003 Dexter ........................ 455/323

(Continued)

FOREIGN PATENT DOCUMENTS

JP    11-022043    1/1999

(Continued)

*Primary Examiner*—Nay A Maung
*Assistant Examiner*—Paul P Tran
(74) *Attorney, Agent, or Firm*—Brundidge & Stanger, P.C.

(57) ABSTRACT

To realize a software radio processing with a reduced circuit area by hardware and software which can process transmission and reception, or synchronization and demodulation in time division. There are provided a circuit DRC that can dynamically change a configuration with a structure that can change the configuration at a high speed, a general processor, and an interface for connection with an external device such as an AD converter or a DA converter. Software radio is realized by using a software radio chip that conducts plural different processing such as transmission and reception, or synchronization and demodulation in time division. The different processing during the radio signal processing can be conducted in time division. As a result, the software radio can be realized with a circuit of a reduced area in a software radio system that allocates regions of an FPGA to the respective processing.

6 Claims, 34 Drawing Sheets

U.S. PATENT DOCUMENTS

| | | |
|---|---|---|
| 6,738,891 B2 | 5/2004 | Fujii et al. |
| 6,801,777 B2 * | 10/2004 | Rusch ..................... 455/452.2 |
| 6,937,877 B2 * | 8/2005 | Davenport ............... 455/552.1 |
| 6,990,087 B2 * | 1/2006 | Rao et al. .................. 370/330 |
| 7,039,129 B2 * | 5/2006 | Ratni et al. ................. 375/324 |
| 7,248,530 B2 * | 7/2007 | Perner ..................... 365/225.7 |
| 2001/0018733 A1 * | 8/2001 | Fujii et al. .................... 712/16 |
| 2002/0098864 A1 * | 7/2002 | Mukai et al. ................. 455/552 |
| 2002/0135502 A1 * | 9/2002 | Lu .............................. 341/107 |
| 2004/0078093 A1 | 4/2004 | Fujii et al. |
| 2004/0078548 A1 * | 4/2004 | Claydon et al. ................. 712/1 |
| 2004/0103264 A1 | 5/2004 | Fujii et al. |
| 2004/0107332 A1 | 6/2004 | Fujii et al. |
| 2006/0004999 A1 | 1/2006 | Saito et al. |
| 2006/0009209 A1 * | 1/2006 | Rieser et al. ................. 455/423 |
| 2006/0010306 A1 | 1/2006 | Saito et al. |
| 2007/0276980 A1 * | 11/2007 | Hageman .................... 710/307 |

FOREIGN PATENT DOCUMENTS

| | | |
|---|---|---|
| JP | 2001-312481 | 11/2001 |
| JP | 2003-318802 | 11/2003 |
| JP | 2004133780 A | 4/2004 |
| JP | 2004133781 A | 4/2004 |
| JP | 2004151951 A | 5/2004 |
| JP | 200618515 A | 1/2006 |
| JP | 200631127 A | 2/2006 |

* cited by examiner

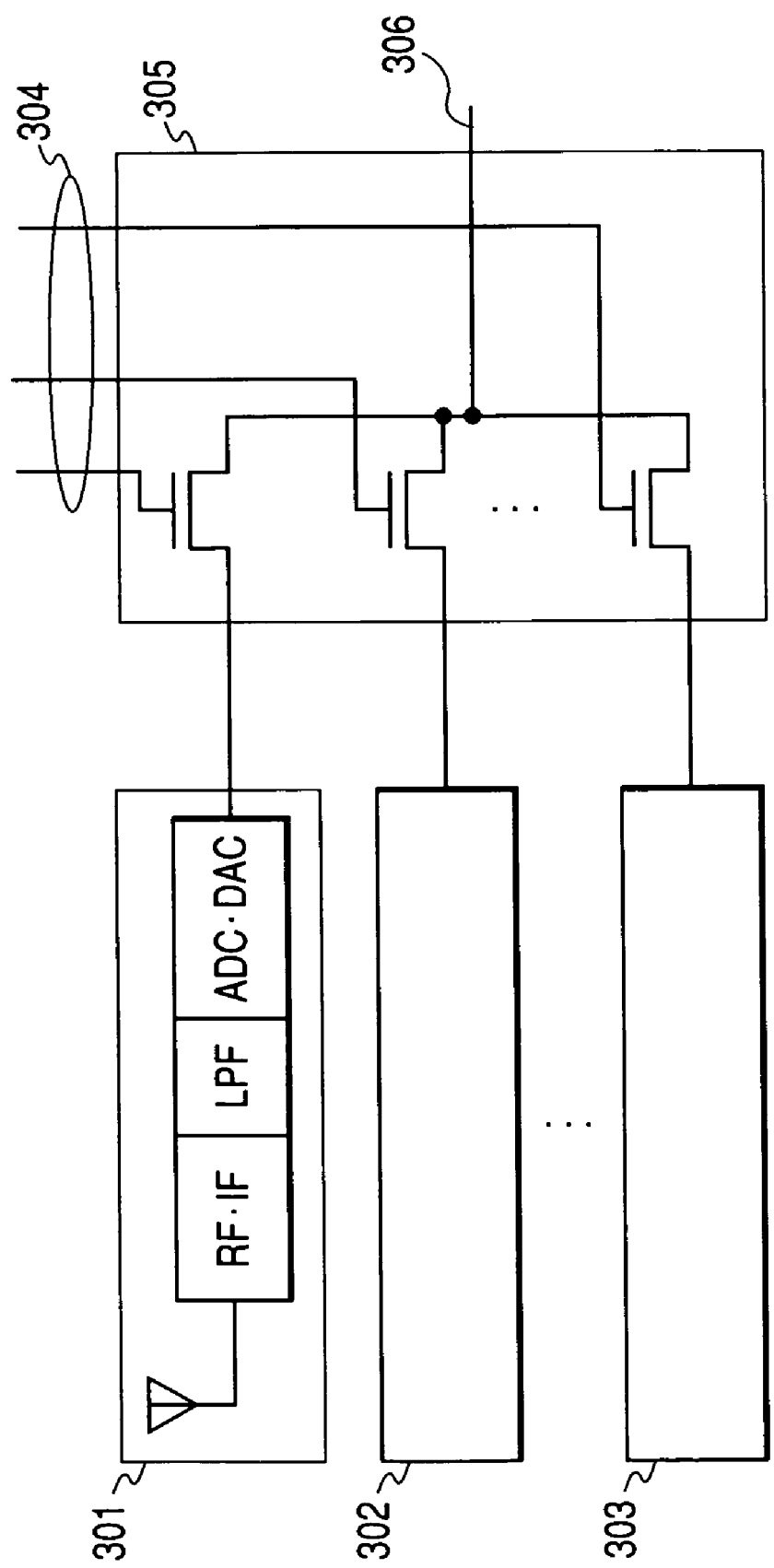

FIG. 14A

| | CONTROL/STATUS REGISTER |
|---|---|
| AECTL | · INSTRUCTIONS OF ALUARE START AND END AND STATUS NOTIFICATION<br>· ERROR NOTIFICATION<br>· INITIALIZE INTERNAL STATES OF ALUA AND LSA<br>· INDICATE PRESENT STATE OF CONFIGURATION SUCH AS ALU ARRAY<br>· ERROR TIME INTERRUPT REQUEST ENABLED OR NOT<br>· NOTIFY INTERRUPT FACTOR |
| CNFGC | · INSTRUCT WRITING OF CONFIGURATION TO ALUA/LSA/IOCTL AND SELECT DESTINATION TO BE WRITTEN TO<br>· INSTRUCT WHICH STATE OF CONFIGURATION SHOULD BE REWRITTEN |

FIG. 14B

| | CONFIGURATION RELATED REGISTER |
|---|---|
| ALUA (ALU CELL) | · DESIGNATE COMMAND OF ALU AND PORTION TO WHICH DATA IS TRANSFERRED |
| LSA (LS CELL) | · DESIGNATE COMMAND THAT LOADS AND STORES DATA THROUGH IOCTL |
| IOCTL | · DESIGNATE PORTION TO BE ACCESSED BY LS IS INTERNAL MEMORY OF ALU ARRAY ENGINE OR EXTERNAL IO |

FIG. 14C

| | DR STATE TRANSITION REGISTER |
|---|---|
| AECTL | · DESIGNATE DR STATE TRANSITION<br>· SET INTERRUPT WITH DR AND START OR STOP OF AAE |

FIG. 22

| EN | LS/PP | RW | LI/D | LBAS | LADD | ITER |
|----|-------|-----|------|------|------|------|
| 2201 | 2202 | 2203 | 2204 | 2205 | 2207 | 2206 |

| IEN | OEN | LSSEL | II/D | IBA | IADD |
|-----|-----|-------|------|-----|------|
| 2207 | 2301 | 2302 | 2303 | 2305 | 2306 |

2300

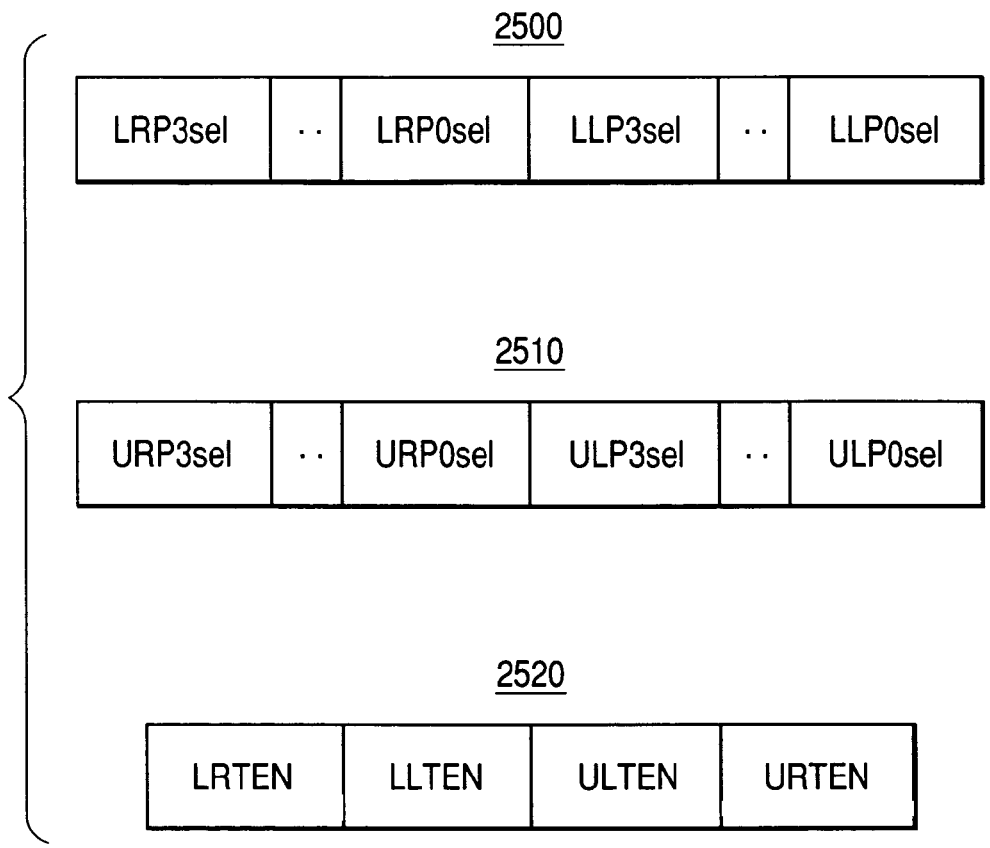

FIG. 35

| TRANSITION NO | TRANSITED STATE | PRESENT STATE | INTERRUPT | TRIGGER SIGNAL | | | |
|---|---|---|---|---|---|---|---|
| | | | | LR | LL | UR | UL |
| 3500 | S1 | R1 | ○ | - | - | - | H01 |
| 3501 | S1 | F2 | | - | - | H01 | - |
| 3502 | R1 | S1 | ○ | - | - | H10 | - |
| 3503 | R1 | R6 | ○ | - | - | H20 | - |
| 3504 | R1 | R3, R6, F1 | | - | - | H02 | - |
| 3505 | R2 | R1, F1 | | - | - | H04 | - |
| 3506 | R3 | R2 | ○ | - | - | - | H02 |
| 3507 | R4 | R6 | | - | - | H40 | - |
| 3508 | R5 | R3, R6, F1 | | - | - | H08 | - |
| 3509 | R6 | R4 | | - | - | - | H04 |
| 3510 | F1 | R5 | | - | - | H80 | - |
| 3511 | F2 | R1, R2, R4 | | H01 | - | - | - |
| 3512 | | S1 | | H02 | - | - | - |

FIG. 36B

| TRANSITION NO | NSTAT | CSTAT | CMSK | INTE | ^EMSK |
|---|---|---|---|---|---|
| 3500 | 0 | 1 | 0 | 1 | H00000001 |
| 3501 | 0 | 8 | 0 | 0 | H00000100 |
| 3502 | 1 | 0 | 0 | 1 | H00000200 |
| 3503 | 1 | 6 | 0 | 1 | H00000400 |
| 3504 | 1 | - | 1 | 0 | H00000800 |
| 3505 | 2 | - | 1 | 0 | H00001000 |
| 3506 | 3 | 2 | 0 | 0 | H00000002 |
| 3507 | 4 | 6 | 0 | 1 | H00002000 |
| 3508 | 4 | - | 1 | 0 | H00004000 |
| 3509 | 5 | 4 | 0 | 0 | H00000004 |
| 3510 | 6 | 5 | 0 | 0 | H00008000 |
| 3511 | 7 | - | 1 | 0 | H01000000 |
| 3512 | 8 | 0 | 0 | 0 | H02000000 |

FIG. 36A

| STATE | CODE |
|---|---|
| S1 | 0 |
| R1 | 1 |
| R2 | 2 |
| R3 | 3 |
| R4 | 4 |
| R5 | 5 |
| R6 | 6 |
| F1 | 7 |
| F2 | 8 |

FIG. 37

| TRANSITION NO | NSTAT | CSTAT | CMSK | ^EMSK |
|---|---|---|---|---|
| 3500 | 0 | - | 0 | H00000001 |
| 3501 | | | | |
| 3502 | 1 | - | 1 | H00000200 |
| 3503 | | | | |
| 3504 | | | | |
| 3505 | 2 | - | 1 | H00001000 |
| 3506 | 3 | 2 | 0 | H00000002 |
| 3507 | 4 | - | 1 | H00002000 |
| 3508 | | | | |
| 3509 | 5 | 4 | 0 | H00000004 |
| 3510 | 6 | 5 | 0 | H00008000 |
| 3511 | 7 | - | 1 | H01000000 |
| 3512 | 8 | 0 | 0 | H02000000 |

SEMICONDUCTOR INTEGRATED CIRCUIT AND A SOFTWARE RADIO DEVICE

CLAIM OF PRIORITY

The present application claims priority from Japanese application JP 2004-290890 filed on Oct. 4, 2004, the content of which is hereby incorporated by reference into this application.

FIELD OF THE INVENTION

The present invention relates to a semiconductor device that is capable of dynamically changing configuration information, and a software radio device using the semiconductor device, and more particularly to a technique that is effectively applied to a semiconductor device having a two-dimensional array structure and a software radio device using the semiconductor device.

BACKGROUND OF THE INVENTION

In recent years, various radio communication systems have appeared with the diffusion and high performance of information processing equipment. For those radio communication systems, there have been proposed software radio devices in which signal processing of transmission and reception necessary for the radio communication is realized by software, and the software is exchanged to another software to deal with plural different wireless systems.

Incidentally, in order to realize the recent radio communication system by software, the versatility and the high processing performance of the processor are required, and there arises such a problem that it is difficult to realize the radio communication system by software in the versatile processor presently used in a personal computer or a server. In addition, a circuit scale that can be realized by an LSI (large-scale integration) is presently expanded with a progress of the semiconductor manufacturing technique, and an LSI that effectively uses a large circuit has been demanded.

Japanese Patent Laid-Open No. H11 (1999)-22043 and Japanese Patent Laid-Open No. 2003-318802 disclose examples in which the above problem is solved by using the LSI that changes the configuration information which designates how the hardware should be structured to change the operation as represented by an FPGA (field-programmable gate array). In the above prior art, because it is possible to change the hardware according to the configuration information in the circuit represented by the FPGA to realize a structure similar to the dedicated circuit, it is expected that the required performance can be achieved.

In addition, as the LSI that improves the processing performance by effectively using a large circuit, attention has been paid to a technique that is called "reconfigurable LSI" among the LSIs that change the operation by changing the configuration information that designates how the hardware should be changed. The dynamic configuration control structure of the reconfigurable LSI is disclosed in Japanese Patent Laid-Open No. 2001-312481.

The above prior art discloses a control structure for autonomously conducting dynamic reconfiguration with no intervention of another controller or CPU in order to improve the throughput. In the control structure, there is a control method for a two-dimensional array having two kinds that consist of processing cells having the processing function, and switching cells that switch over a flow of data between the processing cells. In the structure, in order to conduct the dynamic reconfiguration, the structure of the transition table that is in the configuration state set by a user is in proportion to the number of state transitions.

In the conventional methods disclosed in Japanese Patent Laid-Open No. H11 (1999)-22043 and Japanese Patent Laid-Open No. 2003-318802, because the existing FPGA and PLD (programmable logic device) are assumed, there is required a relatively long period of time for switching over the configuration. For that reason, the switching of the configuration is not executed when one communication system is conducted, and the configuration is switched over only when the wireless system is switched over. Japanese Patent Laid-Open 2001-312481 discloses no wireless system. In this case, for example, circuits for transmission, reception, and synchronization and demodulation which are processing during reception do not operate at the same time, but it is necessary to prepare both of those circuits in advance. For that reason, there arises such a problem that a circuit area is increased. Also, the conventional method disclosed in Japanese Patent Laid-Open No. 2001-312481 suffers from problems on the versatility, the hardware capacity, and the user interface in the reconfigurable circuit system. Those problems will be described below.

A first problem resides in that the above method cannot be applied to the cells having a structure that switches over the flow of data within the processing cells. As the cell structure, although the function of switching over the flow of data within the processing cell is included in the structure, the function does not inhibit the reality, and therefore there is the difficulty in the versatility.

A second problem resides in the table structure that expresses the state transition of the configuration within a module that controls the dynamic reconfiguration. In the conventional method, because the table capacity is proportional to the number of state transitions and the control logic is also complicated, the LSI is recreated when the number of state transitions is increased. In general, in the state transition expression, because the number of state transitions is proportional to the second power of the state number, the flexibility to a change in the specification in the future and the versatility of the applied range are lost so far as the method applies that structure. This makes it difficult to change the configuration after the LSI has been manufactured to perform the variety of the system equipment.

A third problem resides in that a method of issuing a transition event (trigger) to the reconfiguration control module from the two-dimensional array is not particularly disclosed, and the usability of the user who prepares the configuration on the two-dimensional array is not considered.

A fourth problem resides in that a method of designating another operation together with the state transition, for example, a method of conducting the interrupt request operation to the CPU (central processing unit) is not disclosed, and the interlocking operation with the CPU is not considered.

SUMMARY OF THE INVENTION

In view of the above circumstances, one object of the present invention is to realize a software radio processing with a reduced circuit area by hardware and software which can process transmission and reception, or synchronization and demodulation in time division.

Another object of the present invention is to realize a method of optimally changing the configuration in order to autonomously change the configuration in an application that is represented by software radio processing and large in the throughput.

The summary of the present invention will be described in brief below.

The radio signal processing is conducted by using a software radio chip including a dynamically reconfigurable circuit (hereinafter referred to as "DRC") and a versatile processor.

The DRC can change the configuration at a high speed, and includes an interface for connection with an external device such as an AD (analog-to-digital) converter or a DA (digital-to-analog) converter. In the software radio chip, processing is shared in such a manner that the versatile processor processes a protocol layer and the DRC processes a physical layer among the radio communication processings.

In the processing of the physical layer which is executed by the DRC, the circuit area can be reduced by conducting plural different processing such as transmission and reception, or synchronization and demodulation in time division. In order to improve the use efficiency of the circuit and reduce the area, a part of the radio signal processing is conducted by using a dedicated circuit. In this example, the processing made by the dedicated circuit can be used in the plural radio communication systems because of the processing commonly used in the plural radio signal processing.

The structure and system according to the present invention make it possible to realize an application large in the throughput which is represented by the software radio by a hardware small in the area.

BRIEF DESCRIPTION OF THE DRAWINGS

FIG. 3 is a diagram showing a second structure of a pre-processing unit of the software radio device according to an embodiment of the present invention;

FIGS. 14A to 14C are diagrams showing the outline of a setting register of the ALUAE (arithmetic logic unit array engine) according to an embodiment of the present invention;

FIG. 22 is a structural diagram showing the configuration register of the LS cell according to an embodiment of the present invention;

FIG. 23 is a structural diagram showing the configuration register of an IOCTL according to an embodiment of the present invention;

FIG. 25 is a structural diagram showing the configuration register of an EXIOS according to an embodiment of the present invention;

FIG. 26 is a structural diagram showing a state transition control register of an AECTL according to an embodiment of the present invention;

FIG. 35 is a diagram showing the results of classifying state transitions from the state transition diagram according to an embodiment of the present invention;

FIGS. 36A and 36B are diagrams showing a code setting example of the state transition table from the state transition diagram according to an embodiment of the present invention;

FIG. 37 is a diagram showing a setting example of the state transition table from the state transition diagram in the case of deleting an interrupt request operation according to an embodiment of the present invention;

DETAILED DESCRIPTION OF THE PREFERRED EMBODIMENTS

Figure 1:
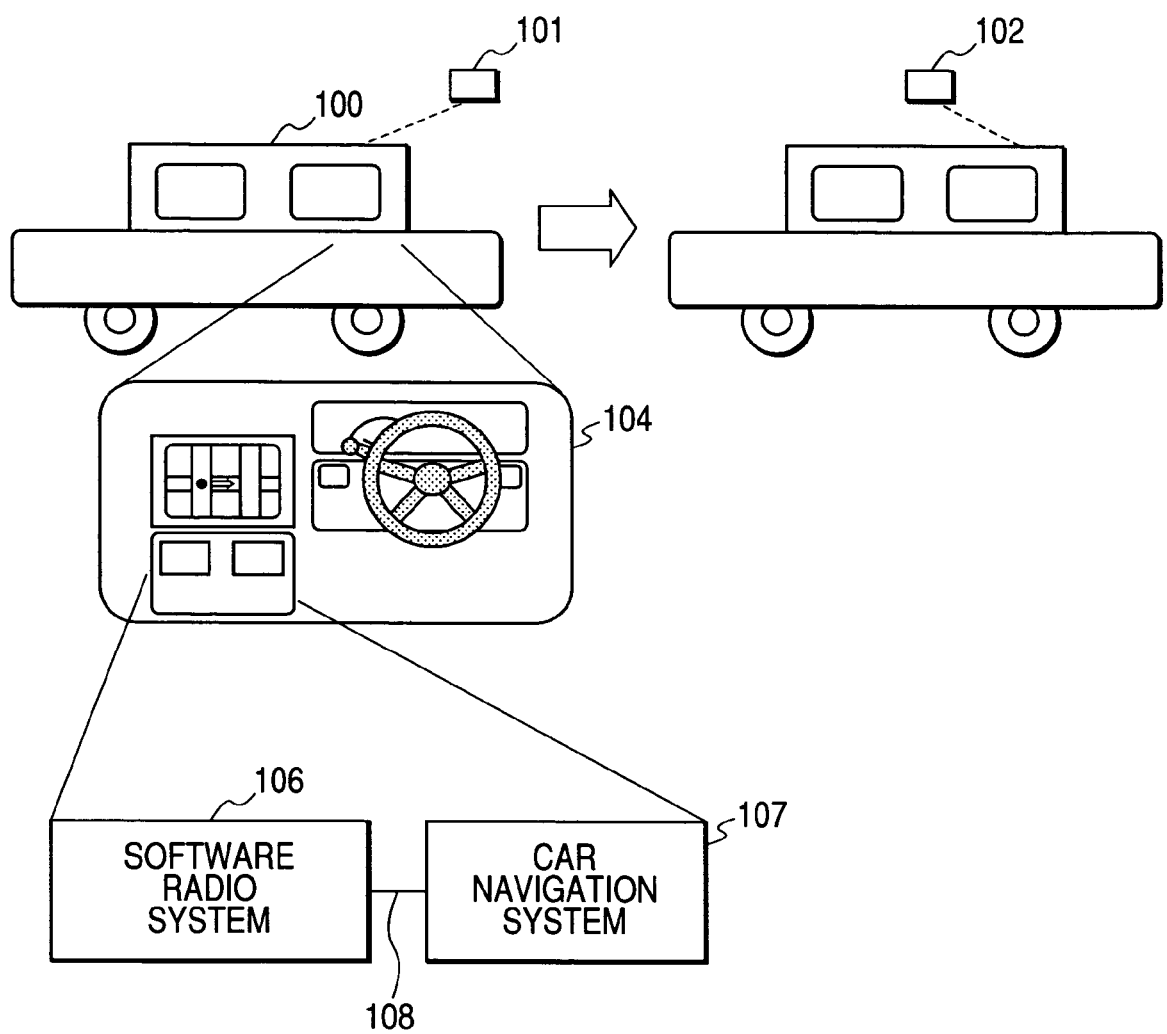
FIG. 1 is a diagram showing the using method and the positioning of an in-vehicle software radio device according to an embodiment of the present invention.

Now, a description will be given in more detail of preferred embodiments of the present invention with reference to the accompanying drawings. In the following description, the same reference numeral and marks represent identical or similar members.

FIG. 1 shows an example of a telematics terminal 104 mounted in a vehicle 100, and an example of applying a system of a software radio device 106 that constitutes a part of the telematics terminal. In the present specification, the software radio device is directed to a radio device that changes the specification of the radio device, which has not been switched over after shipping up to now, by software.

When the radio communication specification changes in the future, or an optimum radio communication specification changes during moving according to the location situations or the electric wave situations of radio base stations 101 and 102, the software radio device switches over the radio communication specification so as to flexibly cope with those changes. The radio communication specifications to be switched over are, for example, a radio LAN (large area network), an ETC (an electronic toll collection system in which a toll is electronically collected through wireless communication) (dedicated short range communication) (DSRC), and a terrestrial DTV (digital television) communication.

Hereinafter, a description will be given of the structure of the software radio device, and the positioning, structure and application method of a DR (dynamic reconfiguration) chip using a dynamic reconfigurable circuit.

1. Structure of Software Radio Device and Positioning of DR Chip:

In FIG. 1, the telematics terminal 104 controls information processing of an image and a sound of a car navigation system 107, and uses the software radio device 106 in order to communicate information data with the car navigation system 107. An interface 108 disposed between the car navigation system 107 and the software radio device 106 is constituted by a standard data communication interface such as a USB (universal serial bus).

Figure 2:
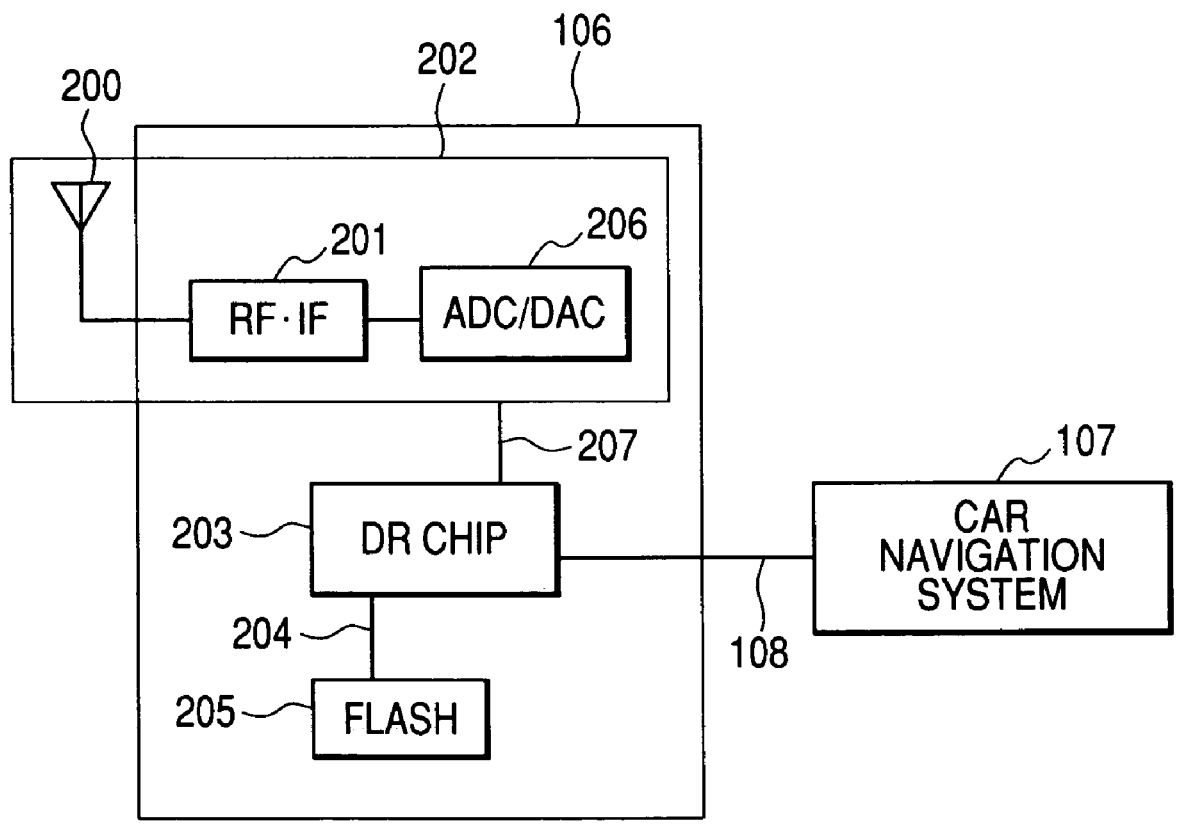
FIG. 2 is a structural diagram showing the software radio device according to an embodiment of the present invention.

FIG. 2 is a block diagram showing an internal structure of the software radio device 106. The radio data is converted into digital data through an analog processing unit 202, subjected to digital processing through a dynamic reconfigurable (DR) chip 203, and then transferred to the car navigation system 107 through the interface 108. In the case of transmitting data, the radio data passes through a reverse route. The DR chip changes the configuration information during operation to make the circuit structure changeable so as to conduct processing at a high speed. In this embodiment, the circuit structure is changed between a first period during which data is received and a second period during which data is transmitted to share the DR chip. As a result, the software radio device can be realized with a small area.

The analog processing unit 202 includes an antenna 200, an RF/IF (radio frequency/infrared frequency) circuit 201, an analog to digital converter (ADC), and a digital to analog converter (DAC). The ADC is used at the time of reception, and the DAC is used at the time of transmission. A flash 205 in the digital processing unit is used for storing various programs therein.

FIG. 3 shows a structure using plural analog processing units according to frequency bands as another embodiment of the analog processing unit 202 shown in FIG. 2. In FIG. 3, reference numerals 301, 302, and 303 are analog processing units provided according to the frequency bands, respectively. In response to a control signal 304 that determines the radio communication specification to be used, a radio signal switch unit 305 operates to select which analog processing unit is connected with the digital processing unit. The control signal 304 is a part of reference numeral 207 in FIG. 2. The digitalized data passes through reference numeral 306 that is a part of the reference numeral 207, and is then transmitted to the digital processing unit.

Subsequently, a description will be given of how the software radio device 106 transmits and receives the radio data with respect to the car navigation system 107 with reference to FIGS. 4A and 4B below.

Figure 4A:
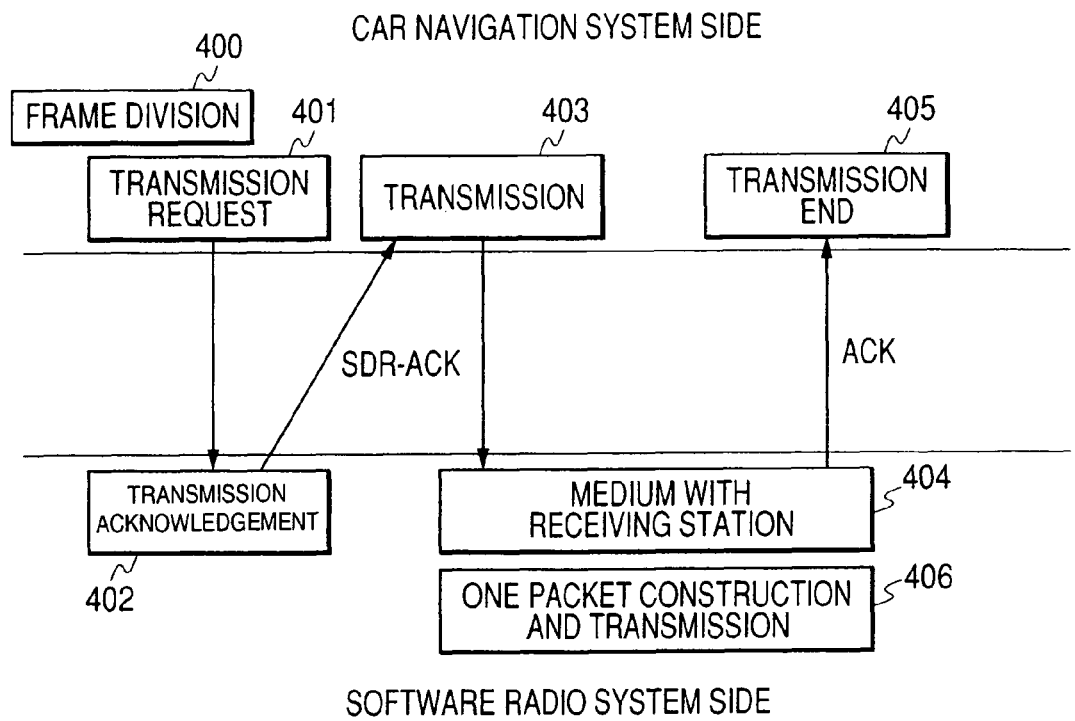
FIGS. 4A and 4B are flowcharts showing a radio realizing procedure of the software radio device and a car navigation system according an embodiment of the present invention.
Figure 5:
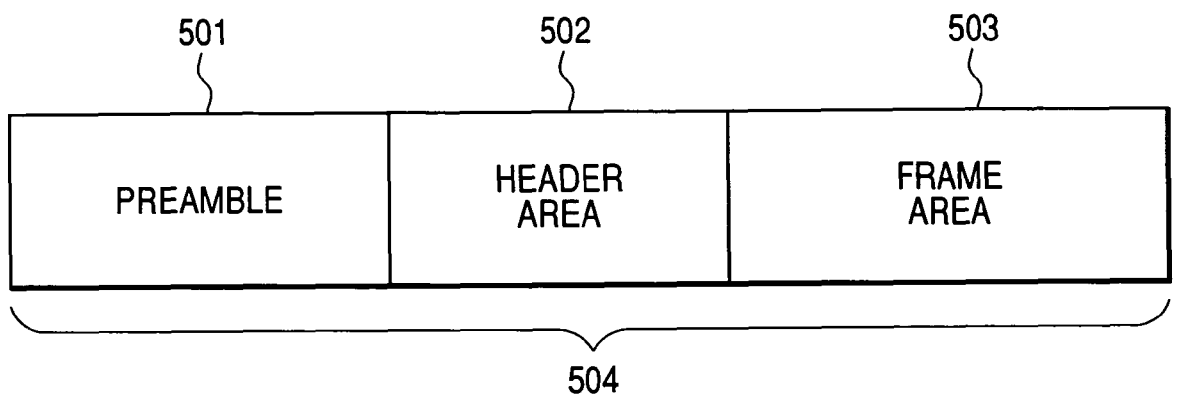
FIG. 5 is a diagram showing the structure of radio communication data according to an embodiment of the present invention.

At the time of transmission shown in FIG. 4A, data is first divided into units of frames by the car navigation system 107 (400). In this example, the frame is a unit for transferring data at the time of radio communication, and in the structure of a radio communication data shown in FIG. 5, the unit is a data portion except for a header in a frame region 503.

Then, the car navigation system 107 gives the software radio device 106 a transmission request 401, and the software radio device 106 conducts a transmission acknowledgment 402 and then returns a transmission acknowledgment signal SDR-Ack (software defined radio acknowledgement) to the car navigation system 107. Thereafter, the car navigation system 107 transfers data of the frame unit (403) to the software radio device 106 (404). Upon receiving the data, the software radio device 106 conducts the construction and transmission 406 of one packet. In this example, the packet is directed to a minimum unit of the radio communication data, and is denoted by reference numeral 504 in FIG. 5. The packet 504 is made up of a preamble region 531 for detecting a head of the packet and a header region 502 in addition to a frame region 503 including the original data.

After all of the packets are transmitted, and the transmission is completed, the acknowledgment signal Ack from a receiving station is transferred to the car navigation system 107 to perform the processing of a transmission end 405. If the transmission fails at that time, the software radio device 106 again conducts the transmission.

Figure 4B:
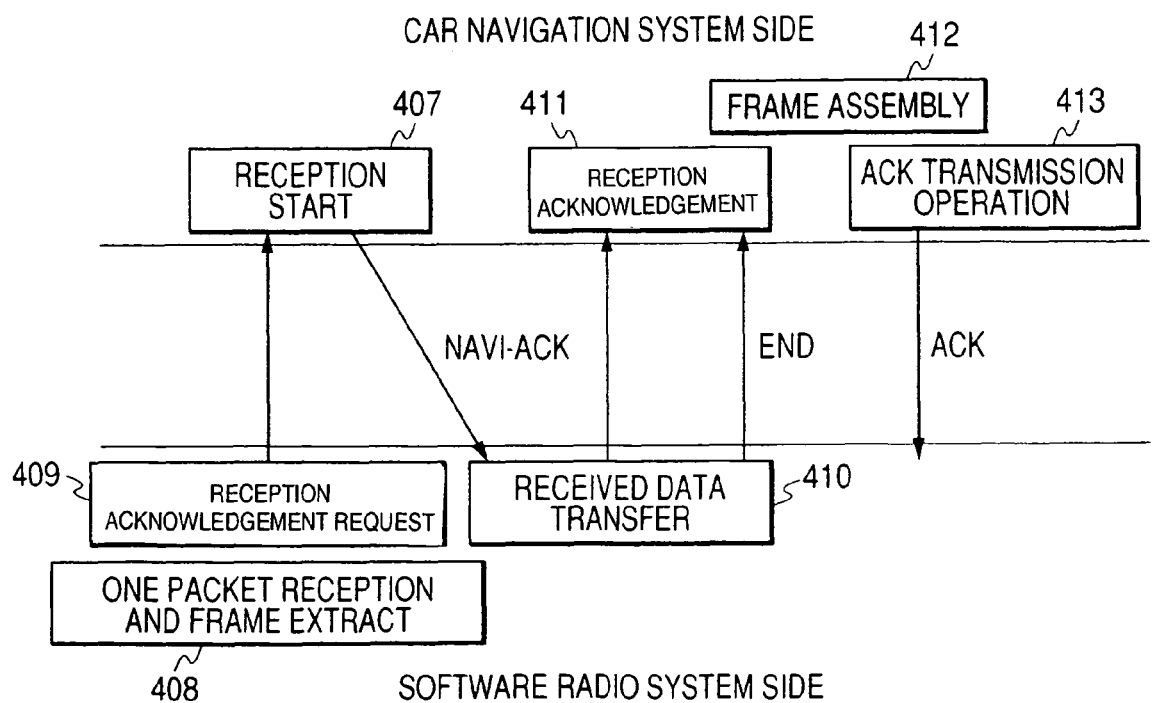

At the time of reception shown in FIG. 4B, the software radio device 106 conducts one packet reception and frame extraction 408, and conducts a reception acknowledgment request 409 that requests to accept the received data with respect to the car navigation system 107. In order to conduct the reception start 407, the car navigation system 107 transfers a reception acknowledgment signal Navi-Ack to the software radio device 106. Upon receiving the reception acknowledgment signal Navi-Ack, the software radio device 106 starts a received data transfer 410, and then transfers the received data of one frame to the car navigation system 107. The car navigation system 107 starts a reception acknowledgment 411. After the software radio device 106 has transferred all of received data to the car navigation system 107, the software radio device 106 transfers a transfer end signal END indicative of a transfer end to the car navigation system 107. Thereafter, the car navigation system 107 conducts a frame assembly 412 and also transfers an ACK (acknowledgement) signal that is returned to a sending station to the software radio device 106 (ACK transmission operation 413). The ACK transmission is one kind of transmission operation, and the software radio device 106 conducts the operation of FIG. 4A.

Figure 6:
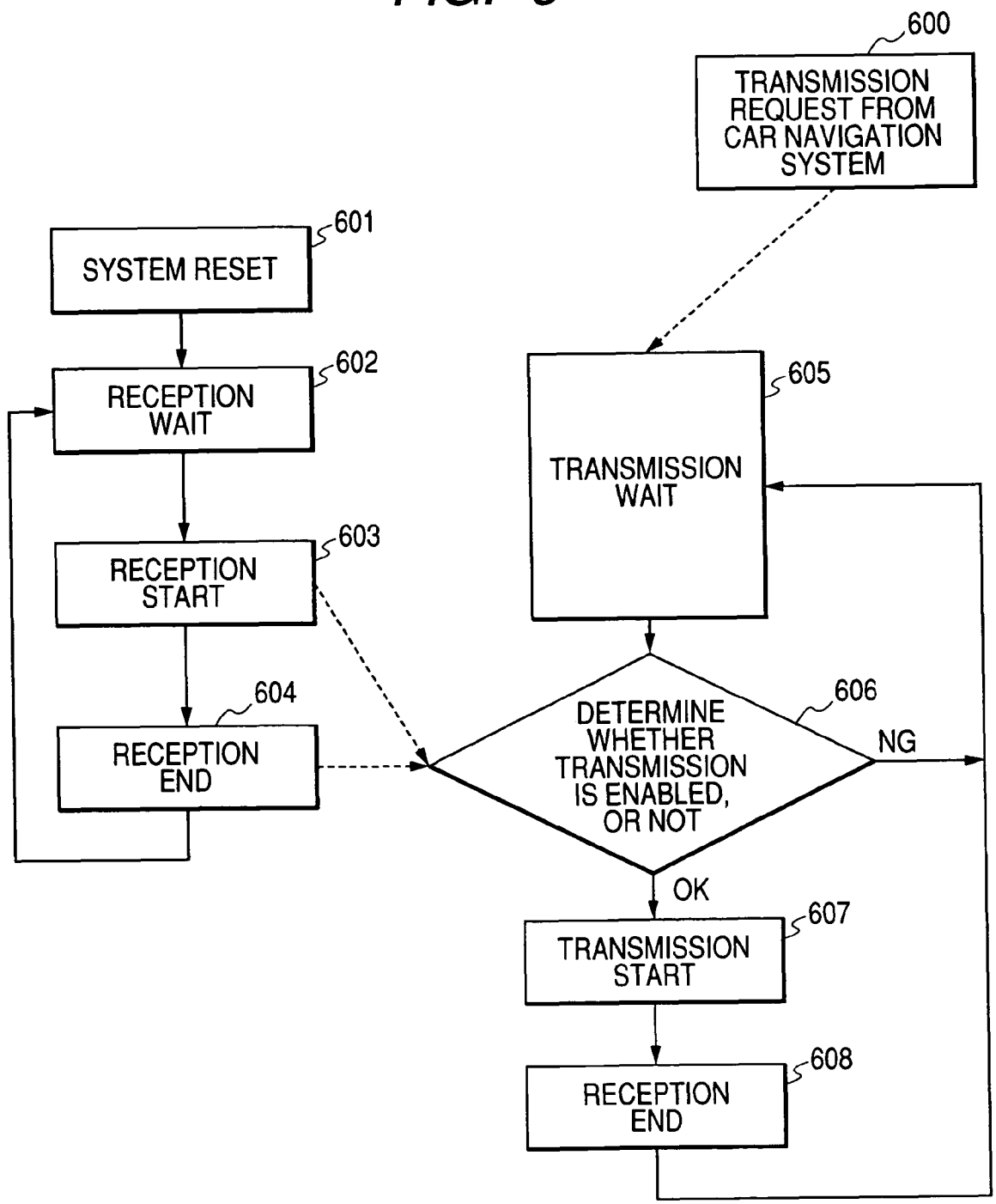
FIG. 6 is a flowchart showing the switching of radio transmission and reception according to an embodiment of the present invention.

FIG. 6 shows a method of switching over the two operations in FIGS. 4A and 4B by the software radio device 106. FIG. 6 is a flowchart for performing both of transmission and reception by the same hardware by changing the circuit structure of the same hardware.

In FIG. 6, the left half including a system reset 601 and a reception wait 602 indicates the reception operation of the software radio device 106, and the right half including a transmission wait 605 and a transmission enable/disenable determination 606 indicates the transmission operation.

First, in the reception operation, after the system reset 601 has been conducted, the operation is always conducted except that the transmission is conducted. The DR chip 203 conducts the reception wait 602 until the head of data of one packet is transmitted from the analog processing unit 202. When the data starts to be transmitted, the reception operation 603 such as demodulation of data starts, and upon completion of the data demodulation, the reception end 604 is conducted. The transmission operation is conducted in between the receptions. The transmission is waited during the reception (605). After completion of the reception, the transmission enable/disenable determination 606 of whether the transmission operation may be implemented, or not, is conducted. If yes, the transmission start 607 is executed, and after one-packet data has been transmitted, the transmission end operation 608 is conducted. As described above, the reception and transmission are processed by the same hardware, thereby making it possible to realize a semiconductor integrated circuit equipped in the software radio device with a small area.

In this embodiment, in the case where the circuit structure of one hardware is changed to conduct the reception operation and the transmission operation, because a trigger of the reception operation is transmitted from an external radio base station, the software radio device cannot be informed of its transmission timing. Accordingly, it is better that the wait state is in a flow of conducting the reception operation.

2. Structure of DR Chip and Interface of Software and Hardware:

Hereinafter, a description will be given of the structure of the DR chip 203 that conducts digital signal processing, and an interface of the software and hardware with reference to FIG. 7. In this example, the software is executed by a central processing unit CPU 700 on the DR chip 203.

Figure 7:
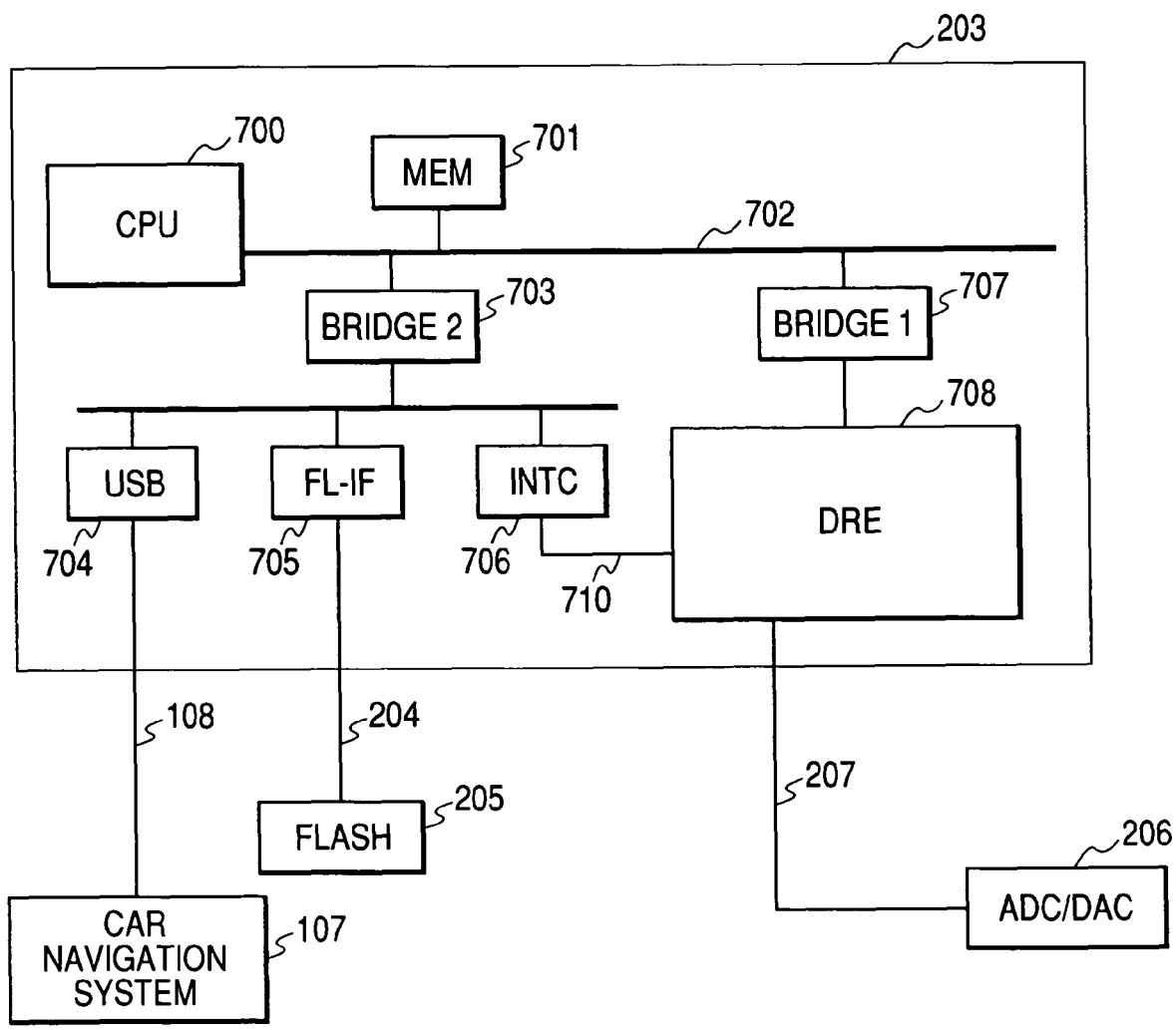
FIG. 7 is a structural diagram showing a dynamic reconfiguration (DR) chip according to an embodiment of the present invention.

2.1 Overall Structure of DR Chip:

As shown in FIG. 7, the DR chip is made up of an ADC/DAC 206, the car navigation system 107, an interface circuit with a flash 205 that is a ROM (read only memory), a dynamically reconfigurable engine (DRE) 708 that conducts the demodulation and modulation operation of received and transmitting data, and a CPU 700 that conducts the control of the overall processing and preprocessing the demodulation and modulation of the received and transmitting data.

First, a peripheral interface of the DR chip 203 will be described. The ADC/DAC 206 is connected with the DRE 708 through an input/output signal line 207. The car navigation system 107 is connected with a USB interface 704 through an input/output signal line 108. The flash 205 that stores program therein is connected with a flash interface (FL-IF) 705 through an input/output signal line 204. In the flash 205 are stored software that is executed by the CPU 700, and configuration data that is executed by the DRE 708. In the present specification, the configuration data is data for designating the hardware structure (circuit structure) of the DRE.

Now, the interface between the DRE 708 and the CPU 700 will be described. The CPU 700 is connected through a CPU bus 702 to a DRE 708, an embedded memory (MEM) 701, the interface control circuit USB 704, the flash interface (FL-IF) 705, and the interrupt control circuit (INTC) 706. The CPU bas 702 and those circuits conduct data transfer through a bridge circuit 703 and a bridge circuit 707.

2.2 Outline of Operation of Radio Software on DR Chip:

Now, the outline of the operation of the radio software on the DR chip will be described with reference to FIG. 8. The radio communication processing conducted on the DR chip is classified into three hierarchies consisting of a protocol processing 800, a radio API (application program interface) 801, and a DRE processing 802. The protocol processing 800 and the radio API 801 are executed by the CPU 700, and the DRE processing 802 is executed by the DRE 708.

In the DRE processing 802, the processing of physical layers such as demodulation of the received data and modulation of the transmitting data, and the processing of a part of an MAC (media access control) layer are conducted. In the radio API 801, an access to the register and the memory on the DRE is processed so that the processing by the DRE can be executed. Reference numerals 820 to 828 are main kinds of radio API. In the protocol processing 800, data preparation and check for prevention of an error, and a header preparation necessary for communication are processed. The communication between the protocol processing 800 and the DRE 802 is basically conducted by using the radio API. In FIG. 8, rectangular boxes 820, 821, and 822 indicate the radio API, and rounded boxes 834 and 835 represent state notifications to the CPU from the DRE due to interrupt.

Figure 8:
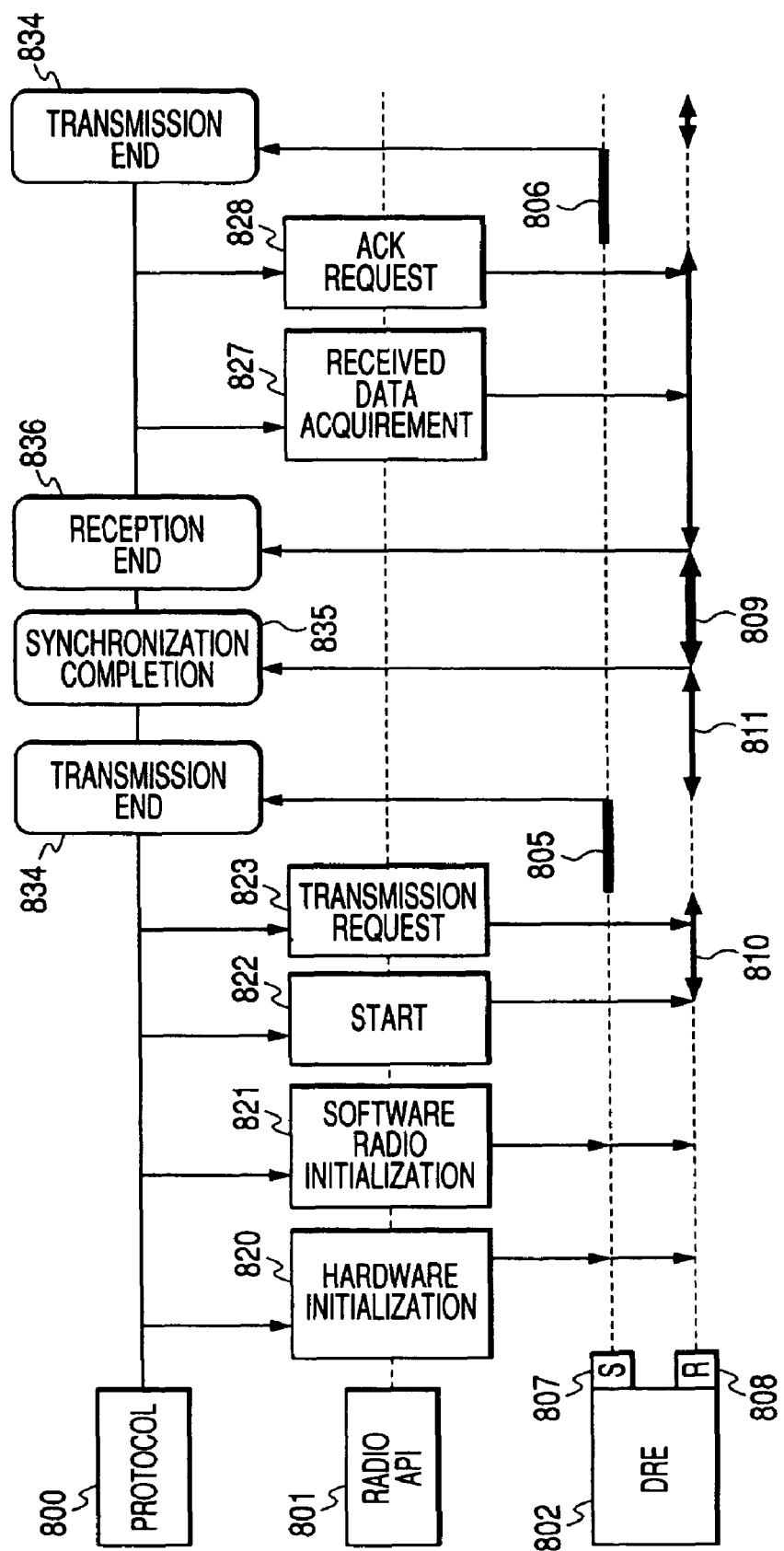
FIG. 8 is an operation flowchart for realizing radio processing on a DR chip according to an embodiment of the present invention.

In lines of the DRE 802 shown in FIG. 8, a line of S807 is a line for transmission operation, bold lines 805 and 806 indicate in-transmission of data, and dotted lines represent that the transmission operation is not conducted. A line of R808 is a line of the reception operation, and a thin arrow 810 indicates processing that is called "synchronous operation" which retrieves an available received data, a bold arrow 809 indicates in-reception by demodulating available data, and a dotted line indicates that the reception operation is not conducted.

Reference numerals 820 to 822 denote parts that conduct initialization. A hardware initialization 820 conducts hardware initialization such as initialization of a memory or a register on the DRE. In a software radio initialization 821, the DRE is initialized for radio communication processing. The storage of the configuration data and the storage of parameters used for radio communication are initialized. In a start 822, the CPU instructs start of the radio communication operation to the DRE. In this example, the DRE starts the synchronous operation 810 of the reception. Also, the DRE conducts the transmission operation according to a transmission request 823 in a state where the available data is not received. The transmission request 823 is issued from the CPU, and transfers data to the DRE together with the issuance of the request. The DRE conducts the transmission operation at a time of 805. Upon completion of the transmission, the transmission end 834 is transmitted with interrupt.

The reception operation waits in a section where transmission is executed, and again starts the synchronous operation together with the transmission end. Upon completion of the synchronization, the synchronization completion is notified (835), and the demodulation operation of data is implemented. The demodulation operation is conducted in a section of 809. Upon completion of receiving and demodulating all of the data, the CPU receives notice of the reception end with interrupt (826). Upon receiving the reception end, the CPU conducts a received data acquirement (827) which acquires the demodulated data. After acquiring all of the received data, the transmission request 828 of ack is conducted. The DRE transmits an acknowledgement in a section of 806 if transmittable, and after completion of the transmission of the acknowledgement, the DRE notifies the CPU of the transmission end 834.

In this embodiment, communication between the CPU and the DRE is only interrupt of the synchronization completion, the reception end, the transmission request, and the transmission end, and data for that interrupt. The CPU does not instruct a change of the configuration of the DRE. Accordingly, the communication amount of the CPU and the DRE can be reduced, and the use amount of the internal bus 702 shown in FIG. 7 can be reduced. Also, the CPU instructs a start to the DRE once, and thereafter the CPU does not need an instruction to the DRE until a sequence of transmission operation and reception operation are completed. Therefore, a juxtaposition operation can be conducted, and high-speed operation of the entire LSI can be conducted. In addition, the transmission and the reception are conducted in time division to realize the same hardware and to realize a smaller area of the semiconductor integrated circuit.

3. Radio Communication Operation and Structure of DRE:

In this example, the operation of the radio communication of the DRE shown in FIG. 8, and the structure for the radio communication will be described.

Figure 9:
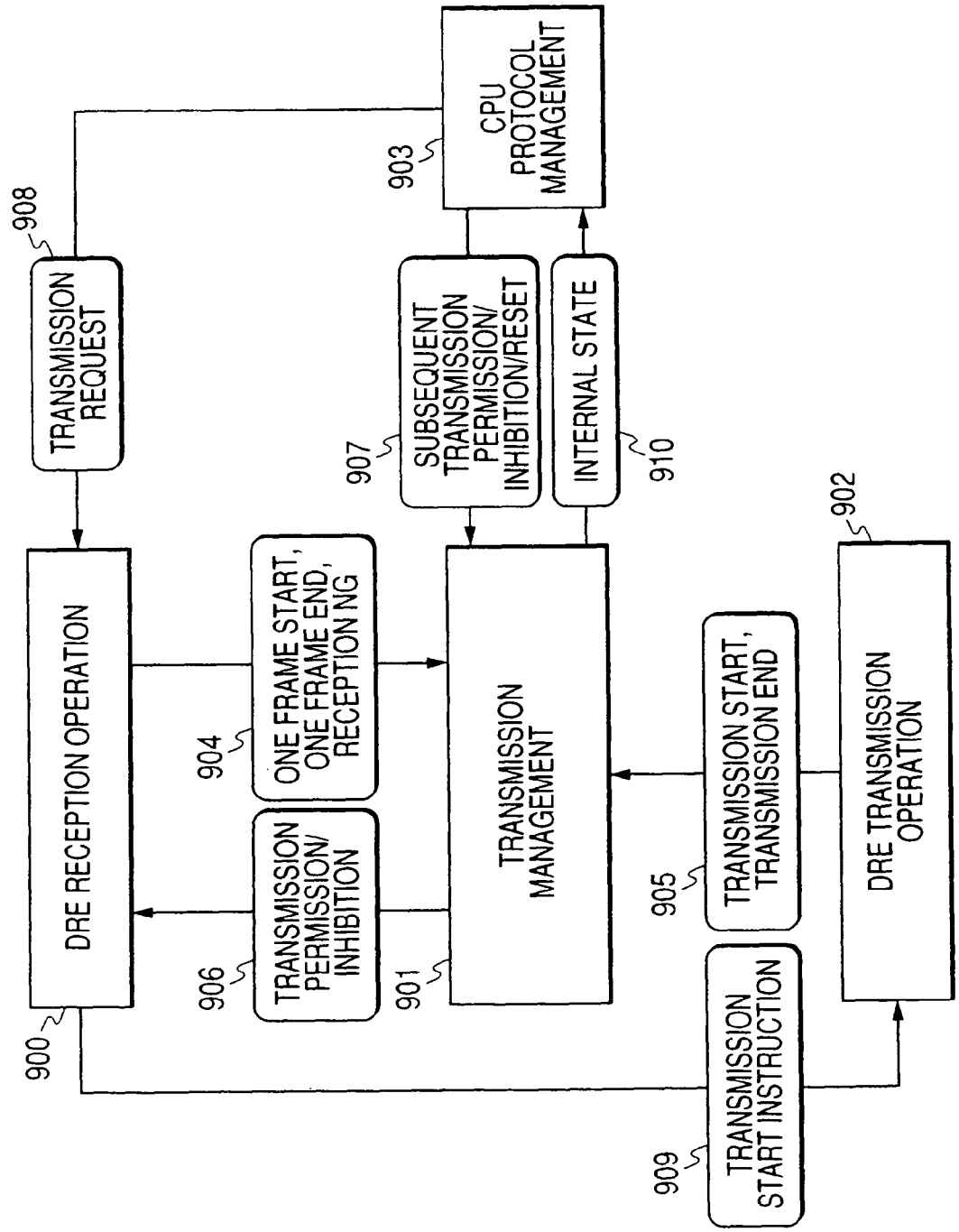
FIG. 9 is an operation flowchart for realizing transmission management by a DRE (dynamically reconfigurable engine) according to an embodiment of the present invention.

3.1 Overview of Radio Communication Operation of DRE:

FIG. 9 shows the operation of the radio communication of the DRE. The DRE has the reception and transmission operation indicative of reception operation 900 and transmission operation 902 as primary functions. The API shown in FIG. 8 is associated with all of those operations. The transmission operation finds out a timing at which another radio device does not conduct transmission, and conducts transmission, and conducts transmission and reception in time division. As a result, the transmission operation also needs to conduct a transmission management.

In order to confirm whether a radio frequency band used by the subject radio device is presently being used, or not, the reception operation 900 basically needs to always conduct the operation, and is dealt with by priority. The reception operation 900 notifies the transmission management 901 of a reception operation state indicated by reference numeral 904. Also, in the case where it can be confirmed that there is no signal that is received in a state where the transmission is permitted from the transmission management 901 (906), and the transmission request 908 is received from the protocol management 903 of the CPU, the transmission operation 902 receives notice of a transmission start instruction 909.

The information which the transmission management 901 receives notice of by the reception operation 900 consists of one-frame start notification which indicates that an available packet is detected to start the reception processing of one-frame data, and one-frame end notification that is issued together with a reception end interrupt 826. One-frame end is issued even when the reception fails.

Upon receiving a present internal state 910 of the transmission management, and a transmission request 401 from the car navigation system 107, the protocol processing 903 of the CPU issues instruction information 907 indicative of permission or inhibition of transmission for determining the transition of the internal state with respect to the transmission management 901, and conducts the transmission request 908 to the reception operation 900. The CPU side also conducts the reset instruction. The transmission operation 902 starts the transmission operation in response to a transmission start instruction 909 from the reception operation 900. Also, the transmission operation 902 notifies the transmission management 901 of the start and end of transmission of one-frame data, and supplies decision information of whether a subsequent transmission operation can be conducted, or not, to the transmission management 901.

The transmission management 901 determines whether the transmission is enabled or not, according to reference numerals 904 and 905 indicative of the situations of reception and transmission, and the subsequent transmission permission/inhibition instruction 907 at a protocol level. The transmission management 901 issues the transmission permission/inhibition instruction 906 to the reception operation 900 on the basis of the determination results of transmission enable/disenable.

3.2 Reception and Transmission Operation of DRE

In this example, a state transition flow that realizes the reception and transmission operation in FIG. 9 by the DRE will be described with reference to FIGS. 10 and 11. In this example, the processing necessary for the reception operation and the processing necessary for the transmission operation are further decomposed, respectively, and allocated to the respective states to conduct processing in time division by the same hardware, and to reduce an area of the DR chip.

(1) Reception Operation

The reception operation is first implemented from the packet detection of an R1 state. In this situation, the reception operation filters the data amount that enables the packet detection by the F1 state as a preprocessing. The packet detection is conducted by detecting a SYNC 1105 among the preamble 1101 as a start of the packet. The SYNC 1105 is usually formed by a determined code such as ALL1, and detects the bits of a part of packets in the detection of packets. Since the packet does not always exist in a communication route, the SYNC 1105 conducts processing until a code in question is detected. Upon detection of the packet, the F1 state is transited to an R2 state.

Also, in the R1 state, the transition to the S1 state that conducts the transmission is determined. The R1 state is transited to the S1 state in the case where no packet is detected in a state where the transmission management 1030 permits the transmission, and the transmission request from the CPU 700 is issued.

Then, symbol detection is conducted in an R2 state and an R3 state. In this example, the symbol is a data group corresponding to data of one bit of information data. Also, the symbol detection is the operation of determining a read timing of data to be used so as to obtain most reliable data. The symbol detection is conducted by using the residual bits of the SYNC. For that reason, even in the symbol detection, data corresponding to the necessary number of bits is filtered by the F1 state as the preprocessing of the R2 state. In the R3 state, if the symbol detection is successful, the R3 state is transited to a subsequent R4 state. If the symbol detection fails, it is determined that the failure of the reception is caused by a trouble of data, and the reception processing is completed, and the R4 state is transited to the R1 state.

Figure 11:
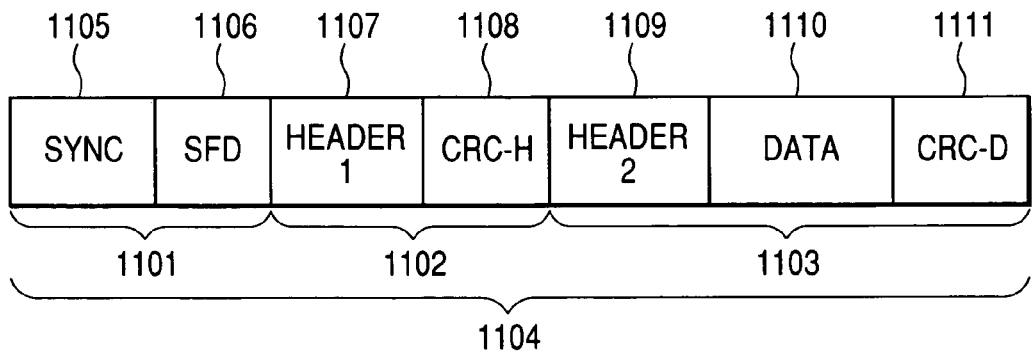
FIG. 11 is a diagram showing the details of radio communication data according to an embodiment of the present invention.

Thirdly, data subsequent to an SFD (start frame delimiter) 1106 in FIG. 11 is demodulated in an R4 state and an R5 state. Likewise, in the demodulation processing, data of the necessary number of bits is filtered in the F1 state and thereafter the demodulation is conducted. In the R5 state, demodulation is conducted while a scramble processing for protection of data and a CRC (cyclic redundancy check) processing for detection of an error are conducted by a radio communication specific processing 1031. When one bit is modulated, one symbol is completed, and the modulation is repeated until the detection processing that is implemented by the R6 is implemented, or until all of data is demodulated.

Finally, in the R6 state, the SFD detection that detects the start of a frame from the demodulation results and the CRC determination that determines that there is no error data are conducted. In the SFD 1106, a given bit string is determined according to the radio system, and the SFD detection is conducted by determination of whether the given bit string coincides with the demodulation result, or not. In the CRC determination, there is determined whether the result of the CRC processing with respect to a header 1 (1107) in the radio communication specific processing 1031 coincides with a CRC-H1108 that is stored in the packet 1104, or not. The CRC-D1111 is the CRC processing result of a header 2 (1109) and data 1110. Different from the CRC-H1108, the determination of the CRC-D1111 is conducted by the radio communication specific processing 1031 because the transfer of the data 1110 to the CPU 700 is conducted directly from the radio communication specific processing 1031. Accordingly, the demodulation is completed at the time when the CRC-D is sent to the radio communication specific processing 1031.

Processing subsequent to the respective various determinations of the R6 state will be described. First, if the SFD detection is acceptable, the R6 state is transited to the R4 state in order to demodulate the subsequent data. If the SFD detection is not acceptable, the R6 state is transited to the R1 state, and the reception is ended as a failure. If the CRC determination of the header 1 (1107) is acceptable, the R6 state is transited to the R4 state. However, if the CRC determination is not acceptable, the R6 state is returned to the R1 state as a reception failure. If the CRC determination of a header 2 (1109) and the data 1110 is acceptable, the data is sent from the radio communication specific processing 1031 to the CPU 700, and the R6 state is transited to the R1 state as a demodulation end.

(2) Transmission Operation

Different from the reception operation, the transmission operation is realized by only the S1 state because a branch generated by the results of the error detection of the radio communication data as conditions is unnecessary. The CPU 700 adds information for the radio communication such as a header to the front of data, and thereafter transfers data to the DRE 708 to issue the transmission request. After the data that has been transmitted from the CPU 700 is subjected to the CRC processing and scrambling by the radio communication specific processing 1031, the data is converted into a radio communication data in the S1 state, and the data is further subjected to transmission filtering in the F2. Thereafter, the radio communication data is transmitted from the DRE 708 to the ADC/DAC 206. After completion of the transmission processing, the S1 state is transited to the R1 state.

(3) Interface with Transmission Management

A method of realizing the interface between the transmission management 901 described in the item 3.1, and the reception operation 900 and the transmission operation 902 will be described below.

Among the interface 904 in the reception operation, one-frame start information is conducted at the time where the packet is detected, and the reception is started. That is, one-frame start is issued when the transition from the R1 state to the R2 state is decided. The information of one-frame end or reception NG (no good) is conducted at the time where the reception fails or the demodulation of one frame is completed after the packet has been detected. That is, one-frame end is issued by the symbol detection NG at the time where the transition of from R3 to R1 is decided, the SFD detection NG which is the reception failure at the time where the transition of from the R6 to R1 is decided, the NG of the header CRC, or one-frame demodulation end.

Upon receiving those notifications, the transmission management 1030 determines a transmittable timing. For example, in a case in which one frame start is not conducted for a given period of time after one frame has been completed, a case in which one frame start is not conducted for a given period of time after the reception is NG, and a case in which one frame end is not conducted at all, and one frame start is not conducted for a given period of time, it is determined that the reception is completed or there is no reception, and the transmission operation is transmittable.

A proper timing at which the transmission permission/inhibit information 906 is received from the transmission management 1030 is a time of starting the repeat processing of the packet detection in the R1 state from the viewpoint of the above standard. This is because the transmission permission is determined at the time where the one frame start is not conducted which can occur only in the R1 state, in the above transmission permission standard.

In the R1 state, the R1 state is transited to the S1 state, and transmission starts in the case of reaching the start time of the repeat processing of the packet detection in a state where the transmission permission 906 is received, and the transmission request is received from the CPU 700.

Then, the interface 905 in the transmission operation will be described. First, the transmission start information is sent when it is decided that the state is transited to the transmission state S1. The transmission end is sent when the transmission is ended in the S1, and the transition to the transmission state S1 is decided. As described above, each of the transmission operation and the reception operation is carved without the limit of carving the transmission operation and the reception operation, thereby making it possible to reduce the area of the DR chip. It is needless to say that the carving of the respective states shown in this embodiment is an example suitable to the software radio, and the respective states are freely carved on the basis of the structure of the DR chip.

3.3 Structure of DRE

Figure 12:
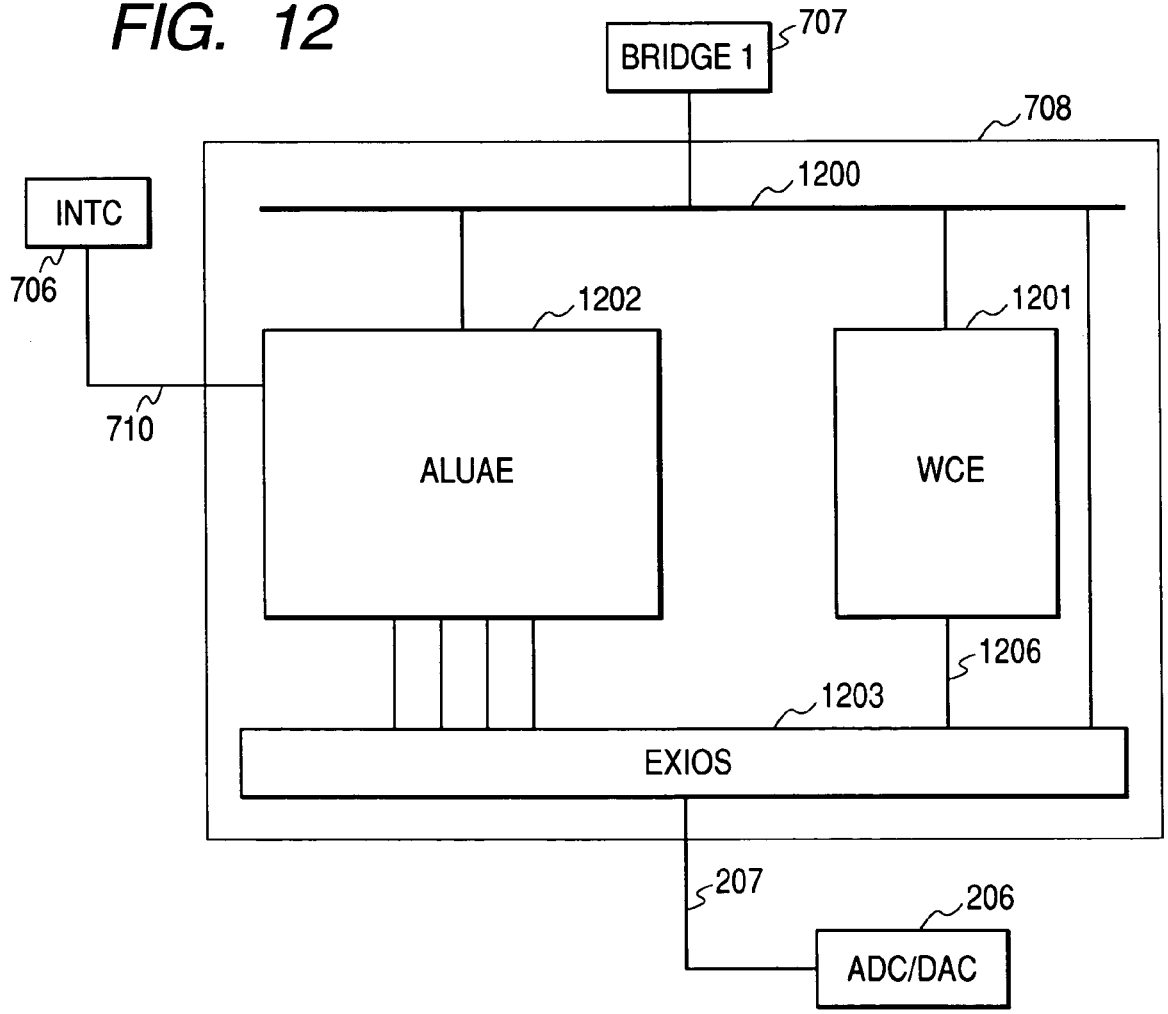
FIG. 12 is a structural diagram showing a DRE according to an embodiment of the present invention.

In this example, the structure of the DRE 708 for realizing the radio communication described in the items 3.1 to 3.2 will be described with reference to FIG. 12. The DRE 708 is made up of an (arithmetic logic unit) (ALU) array engine (ALUAE) 1202, a wireless communication engine (WCE) 1201, an internal bus 1200, and an external input/output switch (EXIOS) 1203.

Figure 10:
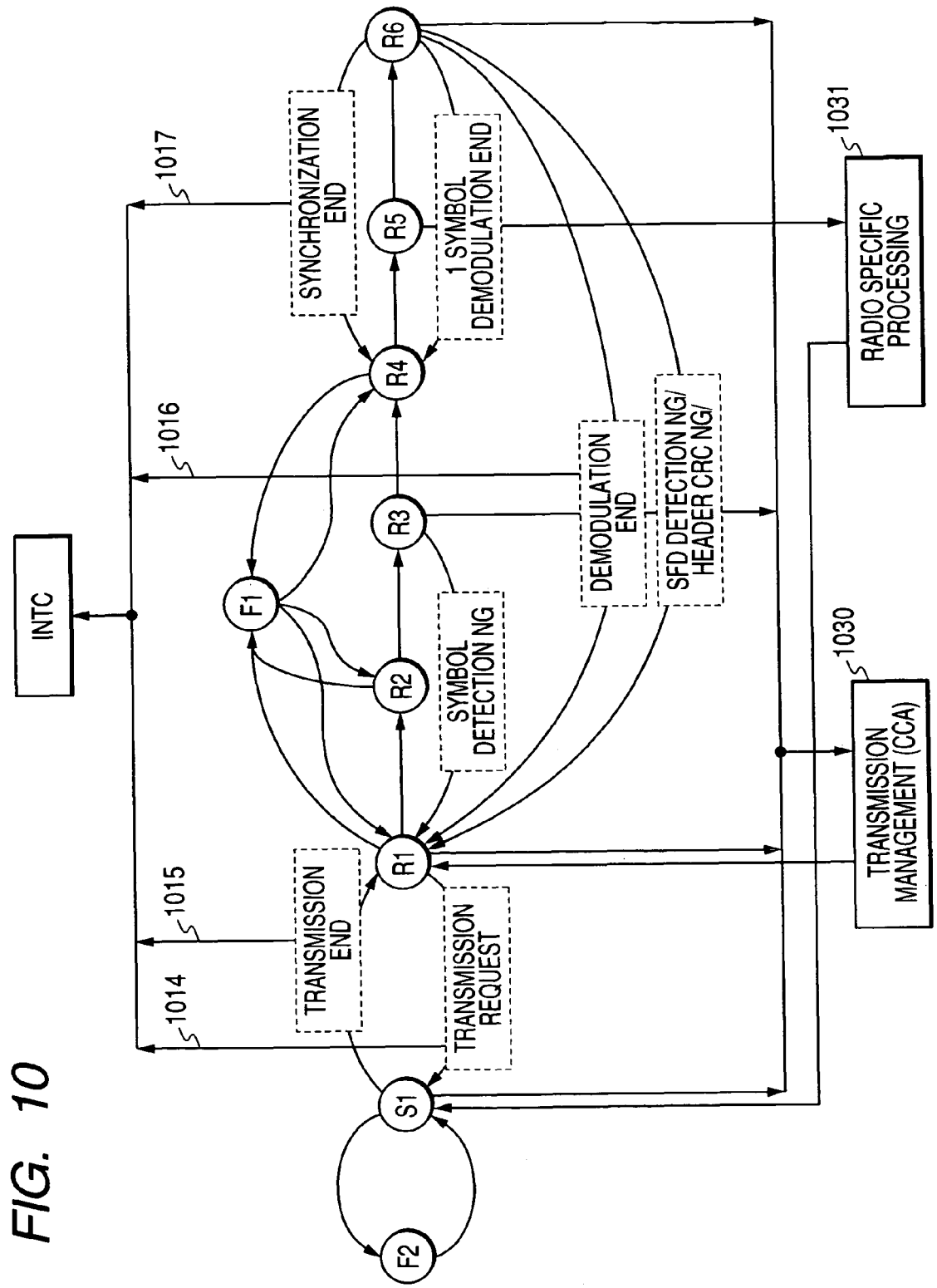
FIG. 10 is a diagram showing a state transition of reception and transmission operation according to an embodiment of the present invention.

The ALUAE 1202 is directed to a circuit module that realizes the state transition of the transmission and reception shown in FIG. 10 by a self-sustaining dynamic reconfiguration. The self-sustaining dynamic reconfiguration means that the self configuration is changed according to the results calculated by the ALUAE 1202 per se. That is, the transition timing between the respective states shown in FIG. 10 is detected without receiving an instruction from the CPU, and the circuit structure is autonomously changed to a circuit structure that deals with the processing of a subsequent state, to thereby delete the communication amount of the CPU and the DRE. An EXIOS 1203 is a circuit that selects a data access destination to the ALUAE 1202 and the external, and there are a WCE 1201, and the ADC/DAC 206 in the external of the LSI as the access destination. The interrupt of the transmission end and the reception end shown in FIG. 8 to the CPU is conducted by notifying the interrupt controller (INTC) 706 of a request through reference numeral 710. Also, the normal data transfer of the ALUAE 1202 and the WCE 1201 can be implemented through the internal bus 1200. The data transfer between the CPU 700 and the ALUAE 1202 or the WCE 1201 is conducted through a bridge 1 (707) and the internal bus 1200. The WCE 1201 is a circuit module that realizes the transmission management 1030 and the radio communication specific processing 1031 which are desired to be processed except for the ALUAE although will be described later.

4. Structure and Setting Register of ALUAE 4.1 Summary

Figure 13:
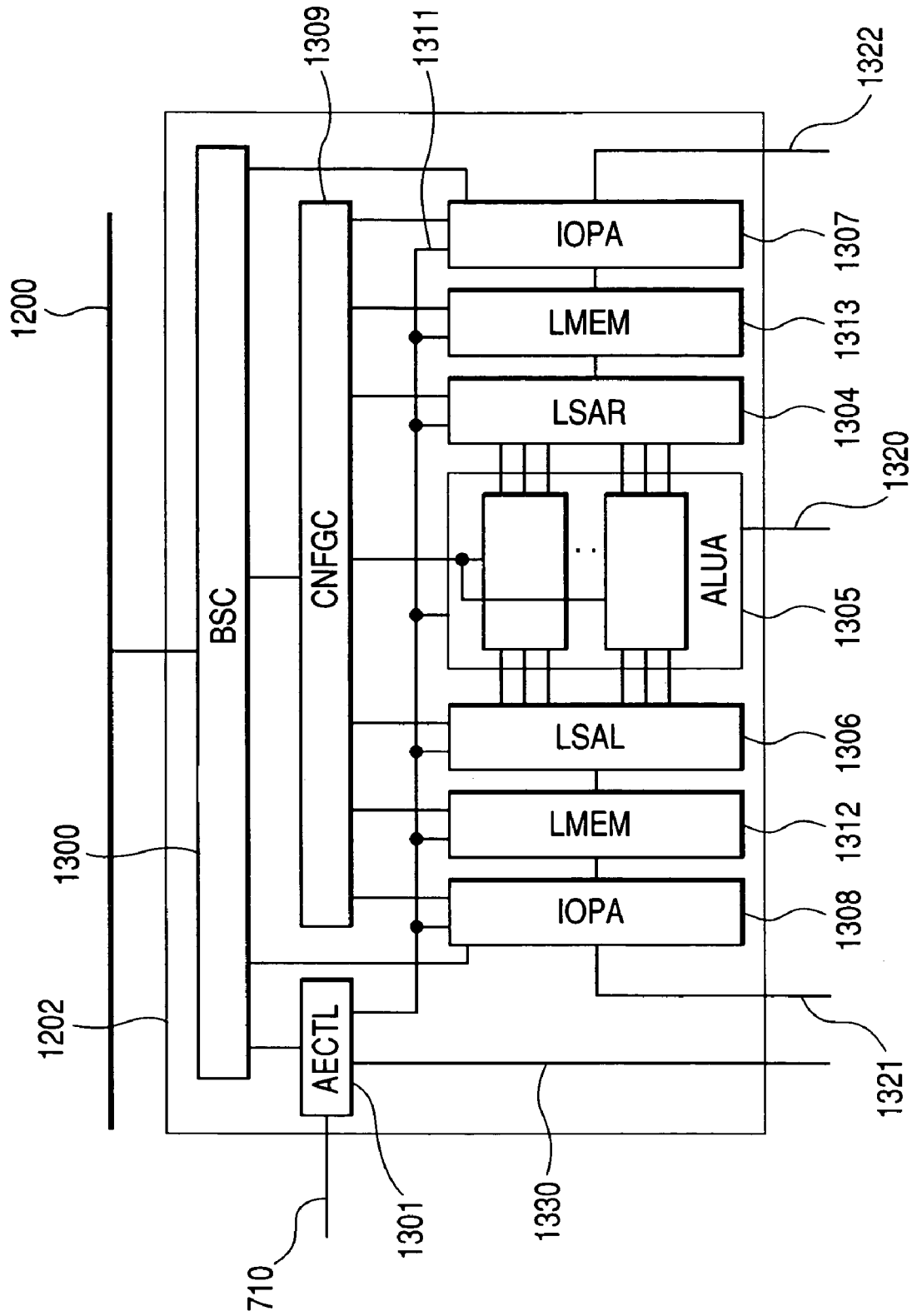
FIG. 13 is a structural diagram showing an ALUAE according to an embodiment of the present invention.

In this example, the summary of the structure and the setting register of the ALUAE 1202 will be described. The structure is shown in FIG. 13. The ALUAE 1202 is connected with the internal bus 1200 through a bus controller (BSC) 1300. The BSC 1300 has a primary function of sharing an input from the internal bus 1200 to the respective members. An array engine controller (AECTL) 1301 controls the ALUAE 1202, and outputs an interrupt request to the interrupt controller INTC 706.

The main block that controls the various processing is formed by an ALU array (ALUA) 1305. The ALUA 1305 is made up of ALU cells arranged in an array. The ALU array changes the processing functions of the respective ALU cells and the connection relationship between the respective ALU cells to realize the processing of the respective states. A load store array (LSA) is used for data transfer between the ALUA 1305 and the memory or the external device. The LSA has an LSAR 1304 which is an LSA located on the right, an LSAL 1306 which is an LSA located on the left, and the ALU cells are interposed between the LSAR 1304 and the LSAL 1306. The input/output to the ALUA 1305 is conducted through the LSAR or the LSAL.

Internal local memories (LMEMs) (1312, 1313) are arranged next to the LSAL 1306 and the LSAR 1304, and include local memories and interfaces of the local memories therein, respectively. The input/output with respect to the LMEM is conducted by the LSA or the IOPA (IO port array). The IOPAs (1308, 1307) are arranged next to the LMEM, and communicate with the internal bus through a BSC 1300. Also, the IOPAs communicate with the WCE and the ADC/DAC outside of the DR chip through the EXIOS from wirings 1321 and 1322.

The ALUA 1305, the LSAs (LSAR 1304 and LSAL 1306), the LMEMs (1312, 1313), and the IOPAs (1307, 1308) can change the configuration dynamically, that is, during execution of the processing in order to change the functions or a destination to be accessed. Also, the configuration register instructs the operation of those modules, and has the kinds and functions shown in FIG. 14B. A temporary storage buffer for changing the configuration register is formed by a configuration data controller (CNFGC).

Each of the ALUA 1305, the LSAs (LSAR 1304 and LSAL 1306), the LMEMs (1312, 1313), and the IOPAs (1307, 1308) is divided into clusters of an 8-line unit, and the configuration can be changed in the cluster unit. In this embodiment described below, two clusters are provided for simplification, but the number of clusters is not limited. Also, the details of the configuration register described above will be described below. The buffer of the CNFGC can be structured by a general buffer.

As shown in FIGS. 14A and 14C, the array engine controller (AECTL) controls the entire ALUAE 1202 and the switch of configuration. Also, the array engine controller AECTL also conducts the general control of the hardware such as the start end and the status notification as well as the control for autonomously switching the configurations of the ALUA 1305, the LSAs (LSAR 1304 and LSAL 1306), the LMEMs (1312, 1313), and the IOPAs (1307, 1308) by the ALUAE per se, the state of the present configurations, an interrupt notification with the switch, and the enable/disenable designation and control of an error notification. An input 1330 to the AECTL 1301 is used for switching over the configuration. The details of those registers and the operation thereof will be described in items 4.2 and 4.5.

A CNFGC 1309 controls the write of the configuration data with respect to the configuration registers described above. The control contents are shown in FIG. 14A. The details of the registers will be described in the item 4.2.

4.2 AECTL, CNFGC Control and Status Register

In this example, the control and status register of the AECTL 1301 and the CNFGC 1309 will be described.

(1) Control/Status Register of AECTL

Figure 15:
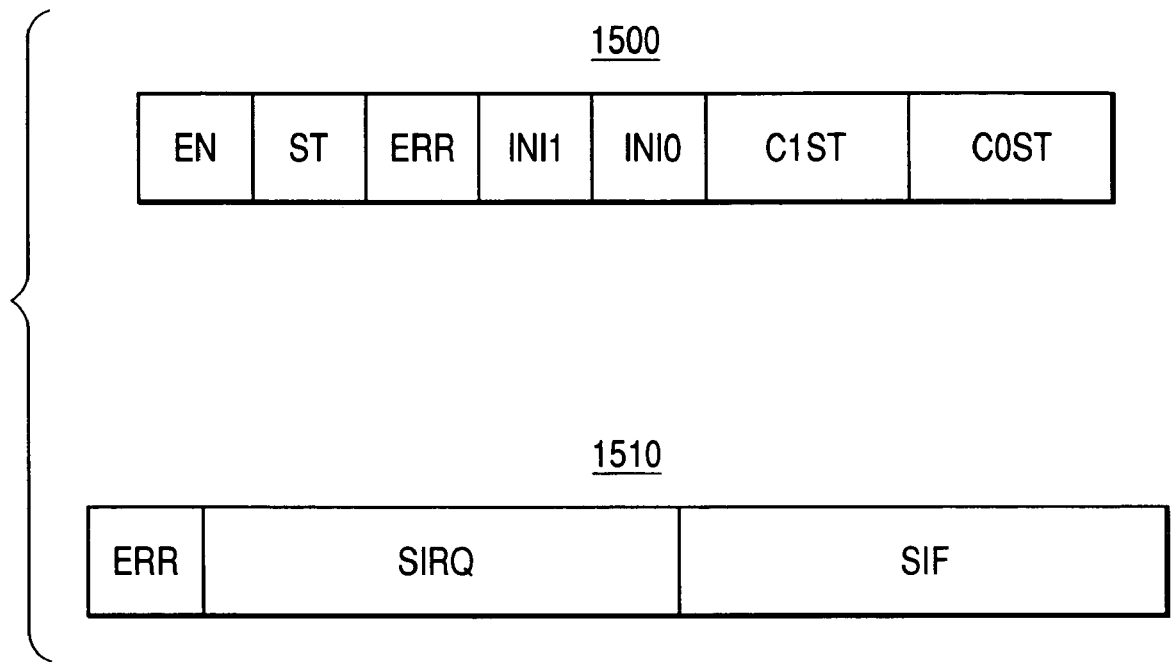
FIG. 15 is a structural diagram showing the control/status register of an AECTL (array engine controller) according to an embodiment of the present invention.

The AECTL 1301 includes a control register 1500 and an interrupt control register 1510 as shown in FIG. 15. The control register 1500 conducts the general control and the status notification, and the interrupt control register 1510 sets the interrupt. In this example, the AECTL 1301 has plural state transition control registers 2600 for controlling the state transition, and the operation of the register and the state transition will be described in an item 4.5.

An EN and an ST in the control register 1500 conducts an instruction (EN) of starting or ending the ALUAE in hardware, and a notification (ST) of the resultant status. When the EN is set to 1, the start is instructed, and when the EN is set to 0, the end is instructed. Also, when the ST is set to 1, an active status is represented, and when the ST is set to 0, a sleeping status is represented. The ERR notifies that it is in an error status. Reference numeral 1 denotes the error status, and reference numeral 0 denotes a normal state. An IN11 and an IN12 instruct the initialization of the internal status of the ALUAE. The IN11 instructs the initialization of a cluster 1 (8 higher lines) and the IN10 instructs the initialization of a cluster 0 (8 lower lines). The initialization sets all of the internal storage elements to 0 or 1. A C1ST and a C0ST denote configuration Nos. in use of the present ALUAE. The C1ST denotes the configuration No. of the cluster 1, and the C0ST denotes the configuration No. of the cluster 0. In this embodiment, 4 bits are allocated to C0ST and S1ST, respectively, and it is possible to control 16 configuration switches.

Subsequently, the interrupt control register 1510 will be described. The ERR of the interrupt control register 1510 designates whether the interrupt request should be conducted, or not, when an error occurs within the ALUAE. When the ERR is 1, interrupt is conducted, and when the ERR is 0, no interrupt is conducted. The SIRQ (serial interrupt request signal) of the interrupt control register 1510 designates whether an interrupt should be conducted at the time of the state transition, or not. The SIRQ has the number of bits as many as the number of the state transition control registers 2600 which will be described below, and can set whether interrupt should be conducted in each of the state transitions, or not. The SIF of the interrupt control register 1510 is indicative of an interrupt factor. The respective bits of the SIF correspond to 1 to 1 with respect to the interrupt represented by the respective bits of the SIRQ. The 0 reset of the SIF which represents an interrupt factor is conducted by writing from the exterior of the DRE or by resetting the DRE.

(2) Control/Status Register of CNFGC

Figure 16:
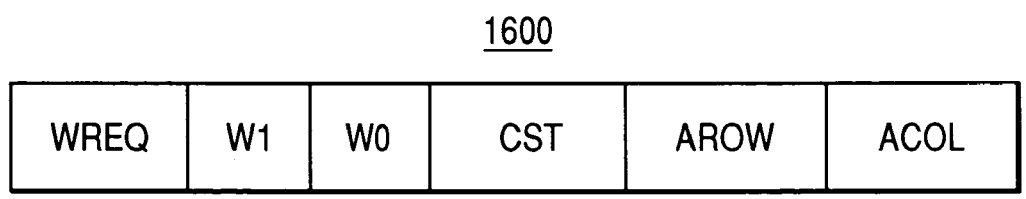
FIG. 16 is a structural diagram showing the control/status register of a CNFGC (configuration data controller) according to an embodiment of the present invention.

A register of the CNFGC is represented by reference numeral 1600 in FIG. 16. The WREQ (write request) in the register 1600 is set to 1 in the case of conducting a writing instruction to the cell of the subject configuration. The W0 and W1 indicate clusters to be written. Writing is conducted on the cluster 1 when the W1 is 1, and writing is conducted on the cluster 0 when the W0 is 1. A CST represents the configuration No. to be written. An AROW and an ACOL are selection signals of the ALU cell which changes the configuration, and select the row and column in the respective clusters.

4.3 Structure of ALU Cell and Configuration Register

In this example, the configuration register will be described in order to clarify the structure of the ALU cell that constitutes the ALUA 1305 and an application method thereof. In this item, (1) how to realize processing in the ALUA 1305 will be roughly described, and (2) the structure of the ALU cell will be described. Finally, (3) the configuration register of the ALU cell will be described.

Figure 17:
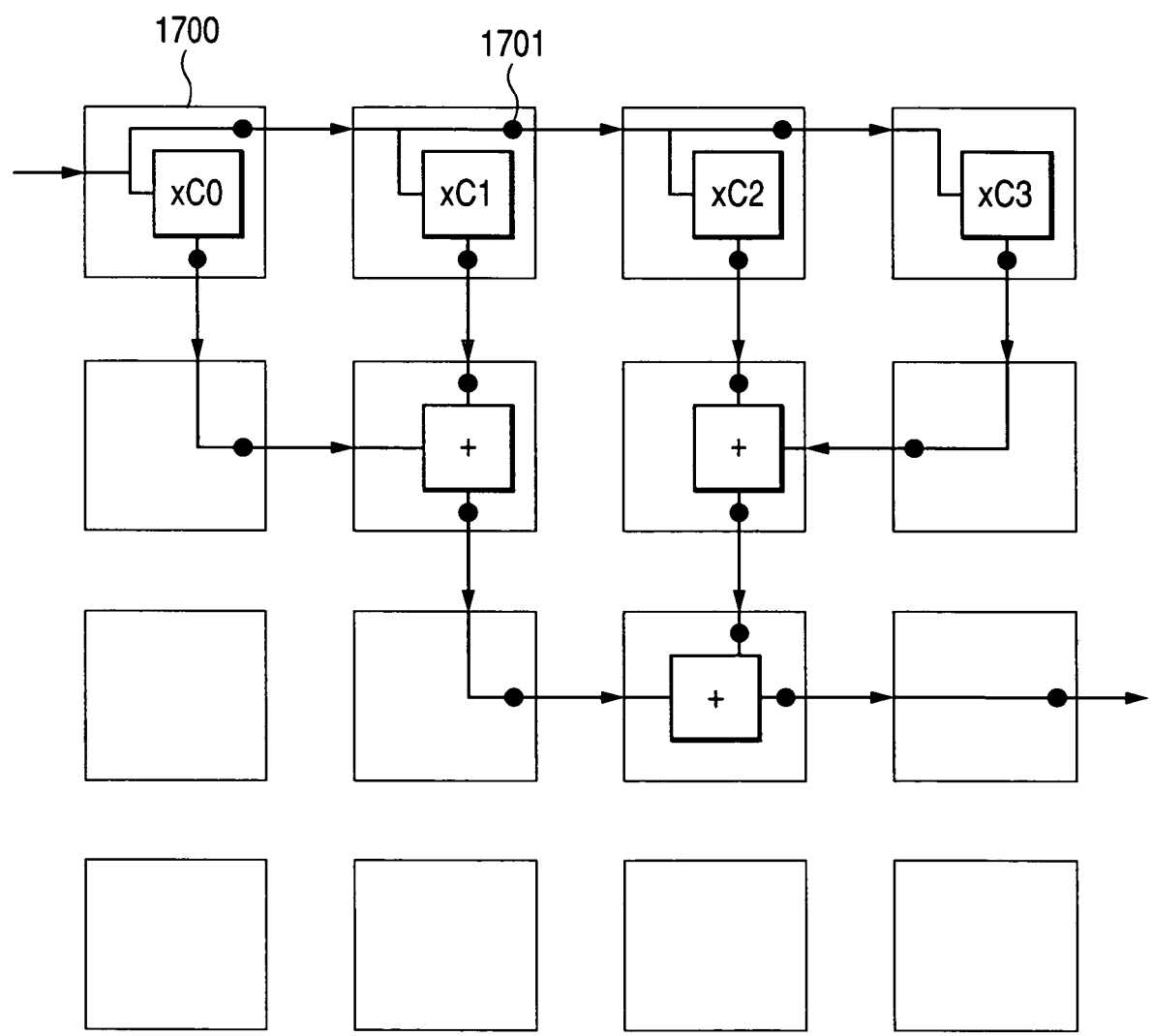
FIG. 17 is a diagram showing configuration information in the case of executing a filtering process by using an ALU (arithmetic logic unit) cell according to an embodiment of the present invention.

(1) Application Image of ALUA FIG. 17 is a diagram showing an example of configuration information for executing a filtering process in which the ALU cells 1700 are arranged in an array of 4×4, and the processing of the F1 state shown in FIG. 10 is simplified. The operation of the cell array of 4×4 will be described with reference to FIG. 17. Symbols (XC0, XC1, XC2, XC3, +) within the blocks written within the ALU cells 1700 shown in FIG. 17 represent functions that are executed by the processing units ALU of the cells, and lines and arrows represent the flows of data. Also, black circles 1701 indicated on the lines within the cells represent flip flops that conduct only data transfer by one cycle.

The configuration information shown in FIG. 17 is to obtain a value represented by the following expression.

$$f[t]=e[t] \times C0+e[t-1] \times C1+e[t-2] \times C2+e[t-3] \times C3$$

In the above expression, f[t] is an output of the filter at a time t, e[t] is an input to the filter at the time t, and C0 to C3 are filter constants. The e[t] is inputted from the LSAL 1306, and f[t] is outputted to the LSAR 1304.

According to this configuration information, the transfer of the data to the right cell and multiplication of the data are executed by the cells on a first row, and addition is executed by the cells on second and third rows. An input e is inputted to the ALUA 1305 set according to the configuration information by a cell on the first row and a first column at each time, thereby making it possible to obtain the filter output f by a cell on a third row and a fourth column in every cycle after 9 clock cycle. The calculation results in this processing are stored in the internal local memory LMEM through the LSA.

In this embodiment, the filter that simplifies the F1 state was described. However, for example, in the case where the F1 state is transitioned to the R1 state, the respective processing functions of the ALU cells and the connection relationships of those cells are changed by switching over the configuration information, thereby making it possible to obtain the circuit structure that deals with the R1 state.

(2) Structure of ALU Cells

Figure 18:
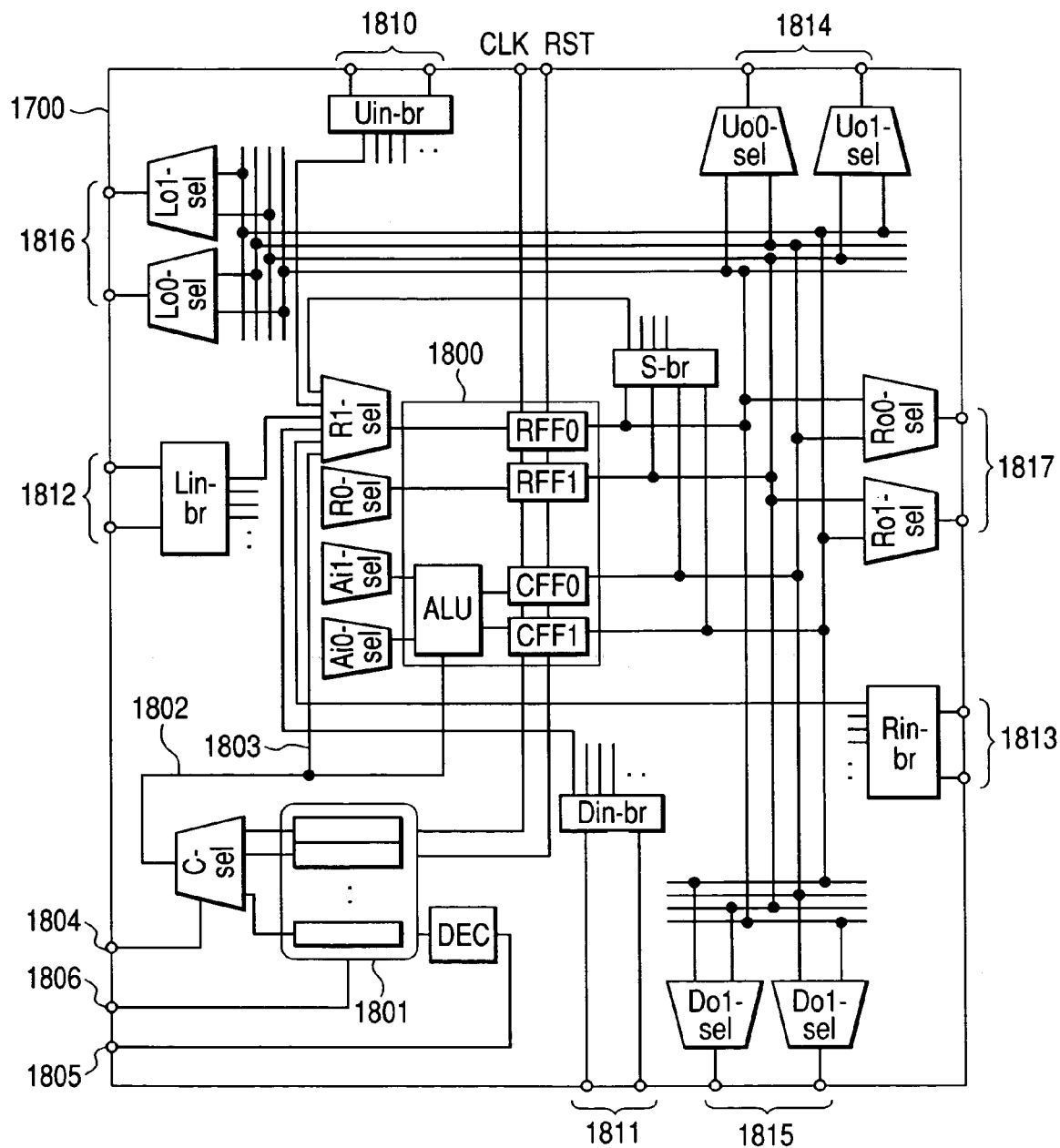
FIG. 18 is a structural diagram showing an ALU cell according to an embodiment of the present invention.

In this example, the structure of the ALU cells 1700 will be described below with reference to FIG. 18.

The functions of the data pass system of the ALU cells 1700 are the functions of processing and data transfer which are made by the ALU indicated by reference numeral 1800. The ALU input two outputs of selectors Ai0-sel and Ai1-sel, and outputs the results to flip flops CFF0 and CFF1. In the case of conducting the data transfer, the outputs of selectors R0-sel and R1-sel are inputted to the flip flops RFF0 and RFF1, respectively.

Inputs to the selectors Ai0-sel and Ai1-sel, R0-sel and R1-sel are selected from the input terminals 1810, 1811, 1812, and 1813, and the outputs of the flip flops CFF0, CFF1, RFF0, and RFF1. The selection of those signals is determined according to a value of the signal 1802 which is selected by the selector C-sel within the configuration register file 1801. The outputs of the ALU cells are outputted from output terminals 1814, 1815, 1816, and 1817 after the outputs of the flip flops RFF0, RFF1, CFF0, and CFF1 are selected by the respective switches.

The input terminals and the output terminals are arranged in four vertical and horizontal directions, and connected directly to the ALU cells adjacent to each other vertically and horizontally. In this structure, the input terminal 1810 and the output terminal 1814 are connected to each other upward, the input terminal 1811 and the output terminal 1815 are connected to each other downward, the input terminal 1812 and the output terminal 1816 are connected to each other leftward, and the input terminal 1813 and the output terminal 1817 are connected to each other rightward. The left and right wirings of the ALU cells at the left and right ends of the ALUA are connected to the ALU cells at the inner side and connected to the LS cells (load-store dedicated cells) at the outer side. Also, the upper and lower wirings of the cells at the upper and lower ends are connected to the ALU cells at the inner side, and are not basically connected at the outer side. The upper and lower wirings toward the outer side of the ALU cells at the four corners are connected to an input/output line 1320 from the ALUA 1305.

The terminals and the wirings have 16 bits for data and 1 bit for control, respectively. The control bit is used for carry in arithmetic addition, or an enable bit of the load-store in the interface with the LS cell. In addition, a signal (valid signal) representing whether the signal is available, or not, is attached to the data signal and the control signal, respectively. The valid signal becomes 1 when the data signal or the control signal is available, and 0 when the data signal or the control signal is not available. The data inputted from the external of the ALUA or data of the results of processing the available data becomes available.

The inputs to the ALU cells are inputted to the input terminals Uin-br, Din-br, Lin-br, and Rin-br, vertically and horizontally, respectively, and the respective inputs are connected to all of the selectors R0-sel, R1-sel, Ai0-sel, and Ai1-sel. The outputs from the ALU cells select values of the data transfer registers RFF0, RFF1, and the ALU output registers CFF0, CFF1 by switches Uo0-sel and Uo1-sel, Do0-sel and Do1-sel, Lo0-sel and Lo1-sel, Ro0-sel and Ro1-sel, vertically and horizontally, respectively. For example, the selector Ro0-sel in the right direction selects any one of RFF0 and CFF0, and Ro1-sel selects any one of RFF1 and CFF1, to output the selected signal.

The selectors R0-sel, R1-sel, Ai0-sel, and Ai1-sel select one signal from the respective two sets of inputs in the four directions, an output of the output selector S-br of the flip flop, and a constant value 1803 in one configuration register selected from the configuration register file 1801 by the C-sel.

In the ALU cell described as "XC0" in FIG. 17, a value C0 obtained by selecting the constant value 1803 by the Ai0-sel, and a value obtained by selecting an input signal from the left terminal Lin-br by the Ai1-sel are multiplied together by the ALU. The result is outputted to the CFF0 and the CFF1, the CFF0 is selected by the Do0-sel, the CFF1 is selected by the Do1-sel, and the selected CFF0 and CFF1 are outputted to the lower output terminal 1815. Also, the data transfer toward the right direction passes through the R0-sel and the RFF0 from the input terminal 1812, and is outputted to the outer terminal 1817 from the Ro0-sel.

Figure 19:
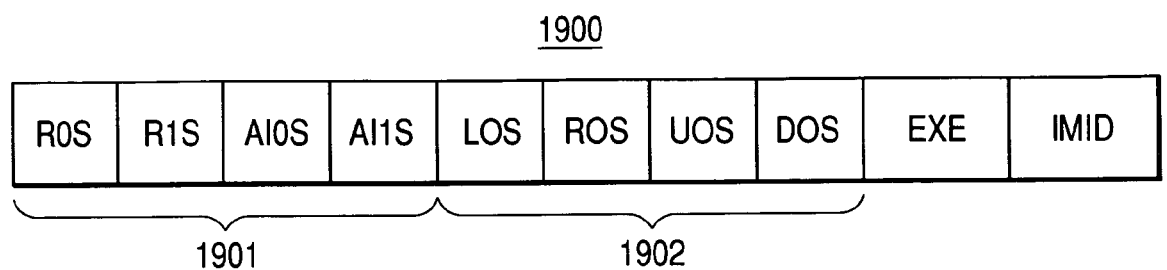
FIG. 19 is a structural diagram showing a configuration register of the ALU cell according to an embodiment of the present invention.

All of the selection by the various selectors and the selection of any one of the processing by the ALU are determined according to a value of the output signal 1802 of the C-sel. The signal 1802 indicates a value of the configuration register 1900 (FIG. 19) of the present state. The signal 1802 is a value selected by the C-sel according to a signal 1804 that selects the present configuration from the configuration register file 1801.

The control for updating the configuration register file 1801 will be described. The configuration register file 1801 is updated by the CNFGC 1309 shown in FIG. 16. The ALU cell is designated by the control register 1600 in the CNFGC 1309 with the result that the input terminal 1805 becomes a signal indicative of an address of the configuration register file 1801 of the ALU cell. A value of the input terminal 1805 is decoded by the DEC into a write enable signal to the designated register. The input terminal 1806 is used to write data in the register of the above state. The configuration register file 1801 is updated according to two signals 1805 and 1806. The signals 1805 and 1806 are parts of the output signals from the CNFGC 1309 in FIG. 13. The signal of the input terminal 1804 which determines the operation of the C-sel is a part of a signal 1311 which is outputted from the AECTL 1301 in FIG. 13. The mechanism related to the configuration register file 1801 and the C-sel is similar to that of another configuration block, the LS cell, and the IOCTL (IO controller).

(3) Configuration Register

The configuration 1900 of the ALU cell for realizing the operation described in the item (2) will be described below.

In the register 1900, a region 1901 is selection signals R0-sel, R1-sel, Ai0-sel, and Ai1-sel, and selects a pair of 17 bits from 10 pairs of inputs in total which consist of two pairs of input terminals to the respective Lin-br, Rin-br, Uin-br, and Din-br, the output selector S-br, and the immediate value (IMID) in the register 1900. The R0S, R1S, AI0S, and AI1S represent the selection codes of R0-sel, R1-sel, Ai0-sel, and Ai1-sel.

A region 1902 is control signals of the output selectors Lo0-sel and Lo0-sel in the left direction as well as the output selectors Ro0-sel and Ro1-sel in the right direction, the output selectors Uo0-sel and Uo1-sel in the upper direction, and the output selectors Do0-sel and Do1-sel in the lower direction. For example, an LOS represents the control signals of Lo0-sel and Lo1-sel. Similarly, an ROS, a UOS, and a DOS represent the control signals of the two selectors in the respective directions. An EXE represents processing of the ALU. The EXE has arithmetic operation such as multiplication, addition or subtraction, and logic operation such as shift or AND. The IMID represents a constant number, and becomes a pair of inputs to the ALU such as the RO-sel and the input selector to the transfer register as described above.

4.4 Load-Store Mechanism of Data

In this example, the load-store mechanism of data viewed from the ALU array 1305 will be described. The load-store is roughly classified into two types. One of the load-stores is an access to a local memory attached to the internal local memories 1312 and 1313. Another load-store is an access to the hardware module outside of the ALUAE 1202 and the IO outside of the DR chip. Those accesses are conducted through a load-store dedicated cell that is called "LS cell".

Hereinafter, the LSA (1306, 1304), the LMEM (1312, 1313), and the IOPA (1308, 1307) will be described. The interface of the LS cell and the ALU cell will be first described in an item (1). The summary of the structure of the LSA, the LMEM, and the IOPA will be described in an item (2). An access structure to the LMEM 2200 will be described in an item (3). An access mechanism to the external which passes through the IOPA 2100 will be described in an item (4).

(1) Interface of LS Cell and ALU Cell

Figure 20:
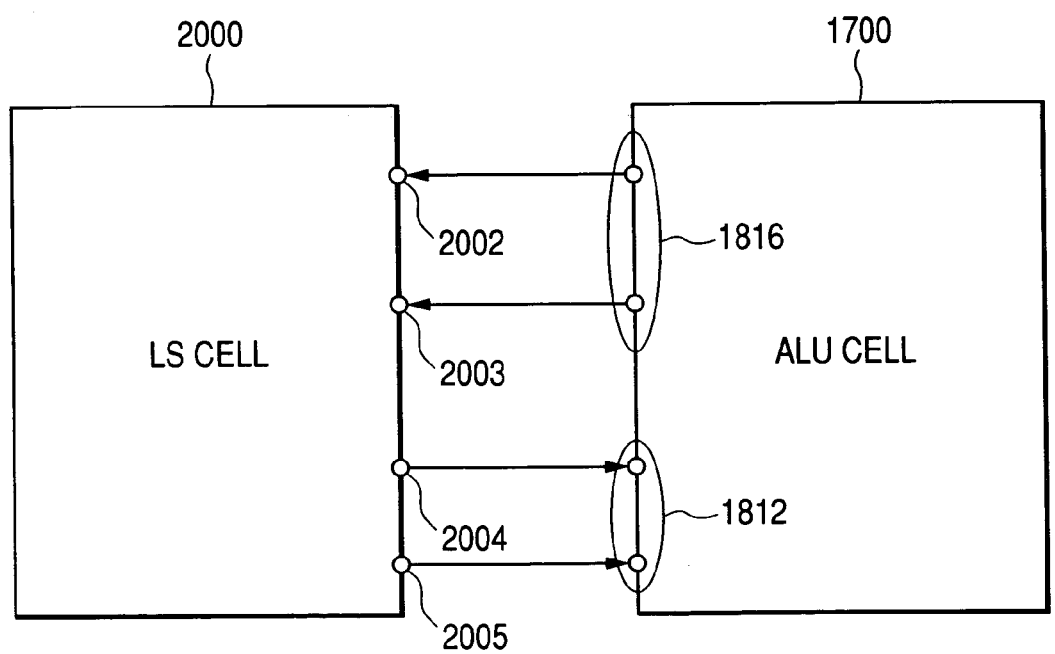
FIG. 20 is a diagram showing the interfaces of an LS cell (load-store dedicated cell) and the ALU cell according to an embodiment of the present invention.

FIG. 20 shows an interface between the LS cell 200 within the LSA and the ALU cell 1700. The higher half of the output data terminal 1816 of the ALU cell 1700 transmits an address and R/W (read/write) bits, and the lower half transmits data that is outputted to the external of the ALU cell. Also, the terminal 1812 receives data that is inputted from the LS cell. The LS cells 2000 are connected to the terminals 2002, 2003, 2004, 2005, and 2006 at the respective terminals of the ALU cells 1700.

(2) Summary of Structure of LSA, LMEM and IOPA

Figure 21:
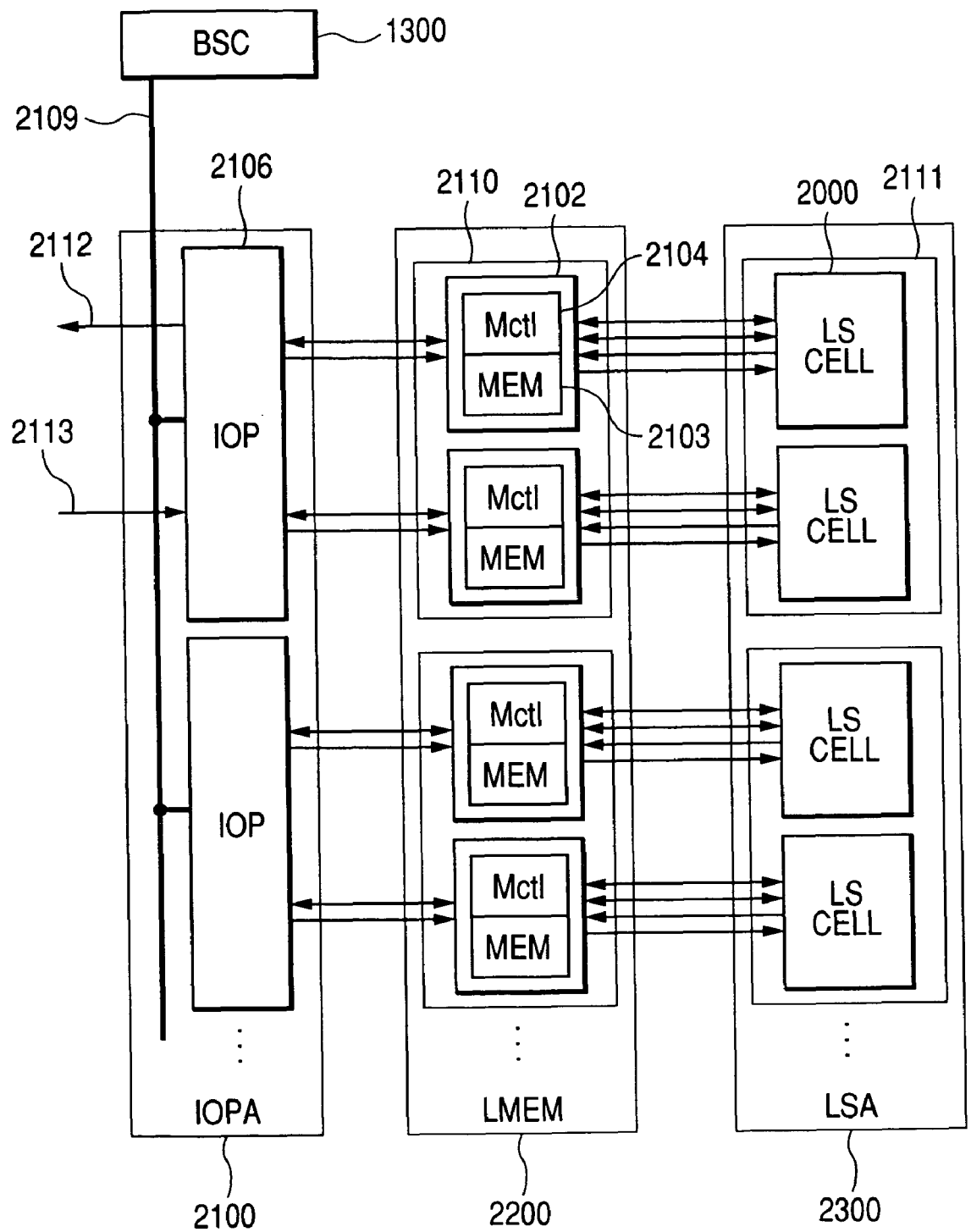
FIG. 21 is a structural diagram showing an IO block and an IOCTL (IO controller) which is a structural element of the IO block according to an embodiment of the present invention.

FIG. 21 is a diagram showing the structural outline of the LSAs (1306, 1304), the LMEMs (1312, 1313), and the IOPAs (1308, 1307). Because the LSAs, the LMEMs, and the IOPAs are symmetrical with the ALUAs, respectively, those members will be described below as an LSA 2300, an LMEM 2200, and an IOPA 2100, as a whole. The LMEM 2200 can be accessed from both of the LSA 2300 and the IOPA 2100. Also, the LMEM 2200 is used as a normal memory from the LS cell 2000, and also serves as an intermediate buffer that allows the LS cell 200 to access to the external.

The IOPA 2100 communicates with the external IO or another module which is connected directly to the ALUAE 1202. In this embodiment, the ADC/DAC 206 corresponds to the external IO, and the WCE 1201 corresponds to another module. Also, the IOPA 2100 has an interface with the BSC 1300 of the internal bus 1200, and selects any one of an access to the external IO and an access to the internal bus through the respective IOPs 2106.

(3) Access Structure to LMEM

In this example, an access to the LMEM 2200 from the LS cell 2000 will be described. The LMEM 2200 is made up of plural memory cells 2102 corresponding to the LS cells 2000. Each of the memory cells 2102 is made up of a memory MEM 2103 that can be accessed from the LS cell 2000 or the IOP (IO port) 2106, and an Mctl (memory controller) 2104 that controls the access to the MEM 2103. This structure makes it possible to execute the access to the memory cell from the LS cell row by row in parallel. In this example, the Mctl 2104 functions to select the access to the LS cell 2000 because the memory cell 2102 is also accessed from the IOP 2106.

The LS cell configuration register 2200 shown in FIG. 22 designates an instruction or a mode for allowing the LS cell 2000 to access to the LMEM 2200. The function of the LS cell configuration register 2200 will be described below. An EN 2201 indicates whether the data access of the LS cell is enabled, or not. An LS/PP 2202 designates whether an address is given from the ALU cell 1700, or the address is automatically generated in the interior of the LS cell. The RW 2203 designates whether the data is read or written.

Hereinafter, a register setting method in the case of automatically generating the address in the interior of the LS cell will be described. An LI/D 2204 designates whether the address is automatically incremented or decremented. An LBAS 2205 designates a base address. An LADD 2007 designates a width of increment or decrement. An ITER 2206 designates how many times the access is repeated. After the maximum number of accesses is repeated, the operation is returned to the base address.

(4) Access Mechanism to the External of ALU Array

In this example, an access mechanism to the external of the ALUAE through the IOPA 2100 will be described. An access to the LMEM 2200 from the IOPA 2100 will be first described, and an access to the IO port array 2100 and the external will be then described.

(a) Access to LMEM from the External

The IOPA 2100 accesses to two sets 2110 of the memory cells 2102 through the IOP 2106. The IOP 2106 has an input port 2113 and an output port 2112 as one set, and is also connected to the BSC 1300 through a wiring 2109. The IOP 2106 is connected to the LS cells through two memory cells 2102 as intermediate buffers. An input port 2113 and an output port 2112 are connected to any one of those two memory cells 2102. Also, the IOP 2106 can select the connection with the CPU bus 2109 other than the input and output ports.

The IO port configuration register 2300 shown in FIG. 23 designates various modes of the above-mentioned IOP 2106. Hereinafter, the function will be described. An IEN 2207 represents whether an access of the input port 2113 is enabled, or not. Likewise, an OEN 2301 represents whether an access of the output port 2112 is enabled, or not. When both of those accesses are disenabled, the IOP 2106 selects an access to the CPU bus 2109.

An LSSEL 2302 selects which cell the input port 2113 and the output port 2112 access to in the set 2110 of two memory cells 2104. This designation determines which cell the input port 2113 and the output port 2112 access to in the set 2111 of the LS cells 2000. This is because the LS cells 2000 and the memory cells 2102 are connected to each other at 1:1.

The IOP 2106 accesses to the set 2110 of the memory cells in the access from the external by automatically generated address. In this situation, the IOP 2106 designates an II/D 2303, an IBA 2305, and an IADD 2306 corresponding to an LI/D 2204, an LBAS 2205, and an LADD 2207 of the LS cell configuration of the LS cell configuration. The description of the reason will be omitted because of the same reason as that of the LS cell. A difference from the LS cell resides in that the access is repeated until the access reaches the maximum address of the memory.

(b) Access to External

Figure 24:
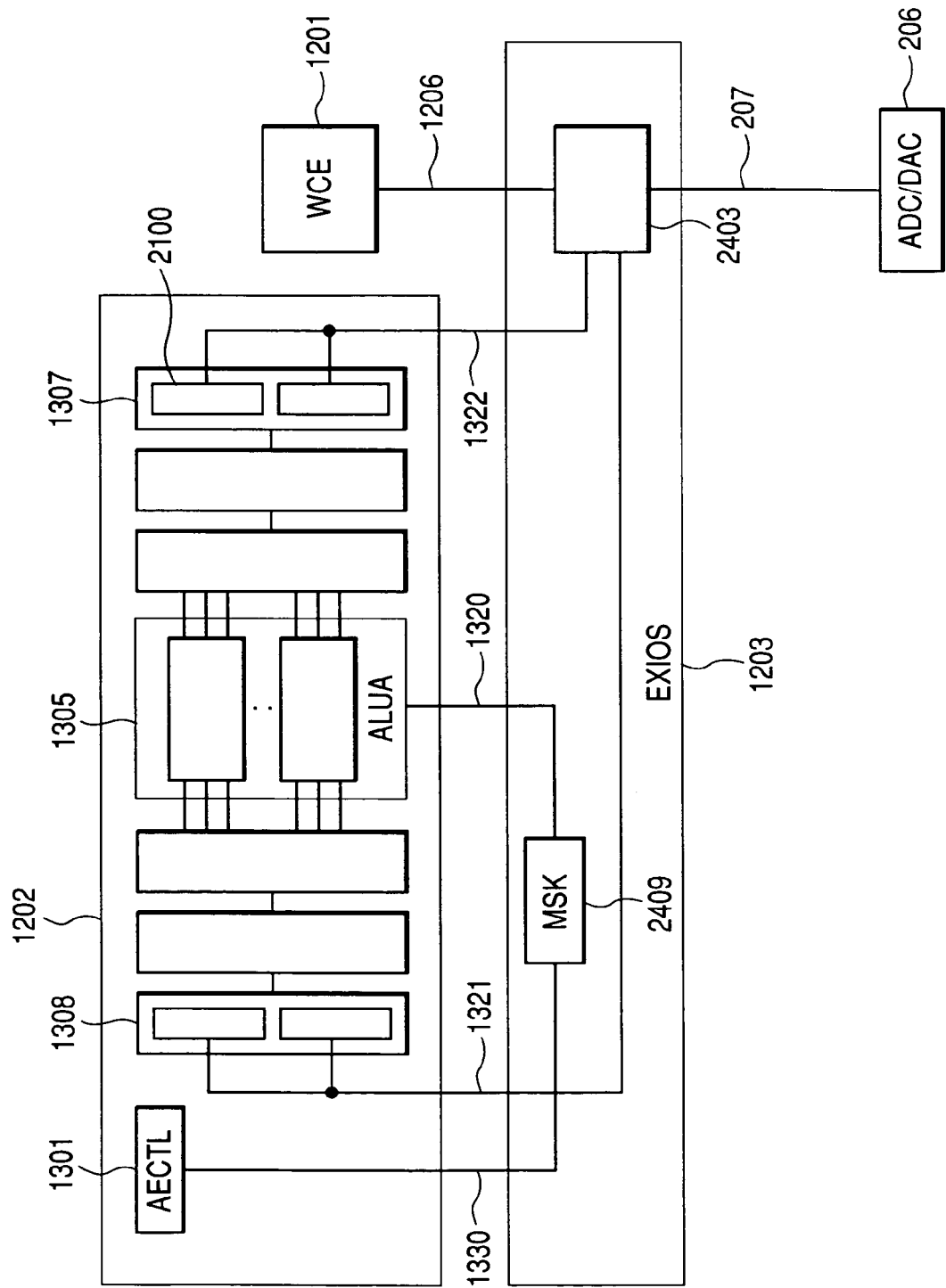
FIG. 24 is a structural diagram showing the positioning of an external, a data access mechanism and an EXIOS (external input/output switch) by the ALUAE according to an embodiment of the present invention.

A mechanism of accessing to the external by using the above-mentioned IOP 2106 will be described with reference to FIGS. 24 and 25 below. As shown in FIG. 24, the IOPA 2100 accesses data to the WCE 1201 which is an ALU array external module, or the AD/DA 206 through the LSI external IO. In the present specification, the IOPA 2100 is a block that collects the IOPs 2106 by the amount of one cluster.

A pair of right and left IOPAs 2100 are provided with respect to each of the highest cluster and the lowest cluster. A signal line group 1321 binds up the input and output signal lines 2112 and 2113 of the IO port cell 2106 shown in FIG. 21 for the left highest cluster and the left lowest cluster. Likewise, a signal line group 1322 binds up the input and output signal lines for the left highest cluster and the left lowest cluster. Those signal line groups 1321 and 1322 are selectively connected to the signal lines 1206 and 1207 to be accessed by a switch 2403 in the EXIOS 1203. Configuration registers 2500 and 2510 of the EXIOS shown in FIG. 25 designate the connection relationship of the switch 2403.

The configuration register 2500 designates a destination to be connected with the input and output from the IOP 2106 of the lowest cluster, and the configuration register 2510 designates a destination to be connected with a right port 3 of the highest cluster. In the configuration register 2500, an LPR3sel selects a destination to be connected with the right port 3 of the lowest cluster. In the present specification, the port 3 is directed to the highest IO port cell 2106 within the cluster, and a port 2, a port 1, and a port 0 are subsequent to the port 3 downward. Similarly, the LLP3sel designates the selection of a destination to be connected with the left port 3 of the lowest cluster. As with the configuration register 2500, in the configuration register 2510, the URP3sel designates the selection of a destination to be connected with the right port 3 of the highest cluster, and the ULP3sel designates the selection of a destination to be connected with the left port 3 of the highest cluster. The same is applied to other ports.

A terminal to the chip external of the EXIOS 1203 is an LSI external terminal that is connected with the member 207 shown in FIG. 24 and has two sets of inputs and outputs. A terminal to the external module other than the ALUAE that is connected with a wiring 1206 extending to the WCE has four sets of inputs and outputs. The bits corresponding to the respective IOPs of the configuration registers 2500 and 2510 of the EXIOS 1203 are for an LSI external terminal selection and an external module terminal selection. The bits for the LSI external terminal selection select the LSI external terminal 1 or the LSI external terminal 2. The bits for the external module terminal selection select an ALUAE external module terminal 1, an ALURE external module terminal 2, an ALUAE external module terminal 3, and an ALUAE external module terminal 4.

4.5 DR State Transition and Transition Table

In this example, a description will be given of a hardware mechanism for realizing the state transition of the configuration, and the setting register such as a state transition table.

(1) Hardware Mechanism for State Transition

When a condition for transition to a subsequent state is met in a processing that is conducted in the ALUA 1305, trigger signals 2520 are issued from the ALU cells located on the four corners of the ALUA. Then, in the EXIOS 1203, an effective trigger signal remains as it is, and an ineffective trigger signal is masked to 0 in an MSK 2409 according to the setting of the trigger enable register 2520. Finally, in the AECTL, a next state is determined with reference to the present state and a value of the trigger signal according to the setting of a state transition control register 2600 shown in FIG. 26. The ALU cell, the LS cell, and the IOCTL receive notice of the next state by a state signal shown in FIG. 13, and switching is executed. The details of the contents of the AECTL will be described later.

(2) Setting Register of State Transition

In this example, the state transition control register 2600 of the AECTL will be described with reference to FIG. 26. The AECTL has plural state transition control registers 2600 therein, which are collectively called "state transition table". In order to issue the trigger signals from the ALU cells on the four corners of the ALUA, data is outputted upward by the upper ALU cell, or data is outputted downward by the lower ALU cell.

Subsequently, masking is conducted by the trigger enable register 2520 shown in FIG. 25. An LRTEN is a code representing whether the trigger signal of the right and lower ALU cell should be enabled, or not. When the trigger signal is made effective, the LRTEN is set to 1, and when the trigger signal is made ineffective, the LRTEN is set to 0. When the trigger signal is made ineffective, all of the corresponding bit string is masked to 0 by the MSK 2409 shown in FIG. 24. Likewise, an LLTEN represents the enable of the trigger signal of the left and lower ALU cell, an URTEN represents the enable of the trigger signal of the right and upper ALU cell, and an ULTEN represents the enable of the trigger signal of the left and upper ALU cell. A signal masked by the MSK 2409 shown in FIG. 24 is transmitted to the AECTL 1301 through a wiring 1330.

Finally, the state transition control register 2600 will be described. An AST means that the switching condition is that the state of the ALUAE 1202 is sleeping or active. Reference numeral 0 indicates a sleeping state, and reference numeral 1 indicates an active state. The AST is used when an initial sleeping state is transited to the active state. In the case where the configuration No. that is now executed is the transition condition, the CSTAT designates the configuration No. The CMSK represents whether the present configuration No. should be included in the transition condition, or not. When the CMSK is 1, the present configuration No. is not included in the transition condition, and when the CMSK is 0, the present configuration No. is included in the transition condition. The configuration No. of a designation to be transferred is designated in the NSTAT. In order to reduce the capacity of the transition table, the EMSK masks the trigger signal 2121 because the plural state transitions are dealt with by one state transition register 2600. The trigger signal 2121 and the value of the EMSK are logically ORed, and the transition is executed when the results are all 1. For example, in the case where a trigger set by the EMSK occurs, the transition is executed not depending on the present configuration No. by setting the CMSK to 1.

5. Setting Register of WCE

The operation of the WCE 1201 and the setting register will be described below. The transmission management 1030 and the radio communication specific processing 1031 will be described in items 5.1 and 5.2, respectively. Those processings cannot be executed by the ALUAE since the processing needs to always operate, or those processings are effectively conducted by a dedicated circuit as compared with a case in which those processings are conducted by changing the structure of the ALUAE. As a result, the dedicated circuit is provided.

5.1 Transmission Management

Figure 27:
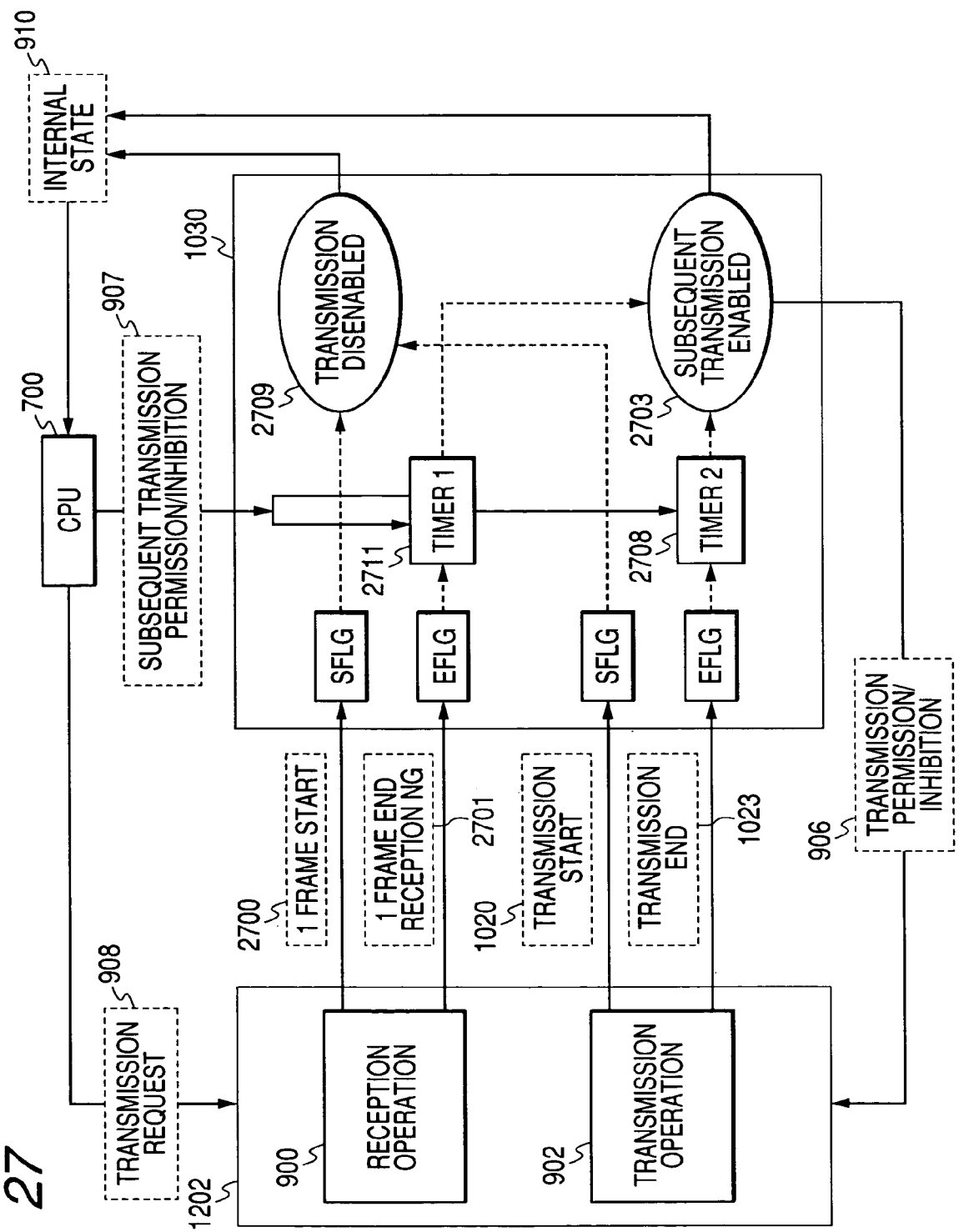
FIG. 27 is a diagram showing an interface of a transmission management module according to an embodiment of the present invention.

In this example, the operation of the transmission management 1030 will be described with reference to FIG. 27, and the setting register will be described with reference to FIG. 28. The transmission management 1030 determines a state related to transmission enable/disenable on the basis of the information 2700, 2701, 1020, and 1023 from the ALUAE 1202, and the information 907 from the CPU 700. As a result, transmission permission/inhibition information 906 is transmitted to the ALUAE 1202, and an internal state 910 is transmitted to the CPU 700, respectively. Thus, the provision of the dedicated circuit for the transmission management makes it possible that the ALUAE autonomously manages transmission and reception without intervention of the CPU.

(1) Transmission Management of Transmission Operation of Normal Data

The operation of the normal data transmission will be described. First, when the CPU 700 receives transmission data together with a transmission request from the car navigation system 107, the CPU 700 issues a next transmission permission 907 to the transmission management 1030, and issues a transmission request to the ALUAE 1202. The transmission management 1030 is in any one of the transmission enable state or the transmission disenable state from the communication history up to now.

Upon receiving the transmission request 908 from the CPU 700 and the transmission request 906 from the transmission management 1030 in the reception wait state of the reception operation 900, the ALUAE 1202 transits to the transmission operation 902 from the reception operation 900. The transmission operation 902 sets a communication start flag (SFLG) in the transmission management 1030 at the time of transmission start. The transmission management 1030 becomes in a transmission disenable state 2709 when an SFLG is set, and issues a transmission inhibition 906 to the ALUAE 1202.

Upon completion of the transmission, the transmission operation 902 sets a communication end flag (EFLG) in the transmission management 1030, and transits to the reception operation 900 from the transition operation. The transmission management 1030 starts counting by a timer 2 (2708) when the EFLG is set, and the next transmission permission 907 is set from the CPU 700. Upon completion of the count that is set in the timer 2 (2708) in advance, the transmission management 1030 transits to the transmission enable state 2703, and issues the transmission permission 906 to the ALUAE 1202.

(2) Transmission Management of ACK Transmission in Reception Operation

There are three kinds of transmission managements at the time of reception operation. That is, there are a management that the operation is set in the transmission disenable state 2709 when the reception operation is conducted, a management that the operation is set in the transmission enable state 2703 in order to transmit the ACK, and a management that the operation is set in the next transmission enable state 2703 at the time of reception failure (NG).

The first management is conducted when the packet is detected by the reception operation 900, and it is determined that the reception of one frame starts, and when the one-frame start information 2700 is set to the SFLG as a flag. When the SFLG is set, the transmission management transits to the transmission disenable state 2709.

The second management is conducted when it is determined that the demodulation of one frame is completed. This determination is conducted when the EFLG 2707 is set, and the next transmission permission flag is set.

The transmission management 1030 starts counting by a timer 1 (2711) when the EFLG is set, and the next transmission permission 907 is set from the CPU 700. When the transmission management 1030 transits to the transmission enable state 2703 when the count that is set by the timer 1 (2711) in advance is completed, and issues the transmission permission 906 to the ALUAE 1202.

The third management is conducted when it is determined as the reception failure (NG), and the next transmission permission flag is set. The subsequent operation is the same as that of the second management.

(3) Setting Register of Transmission Management

Figure 28:
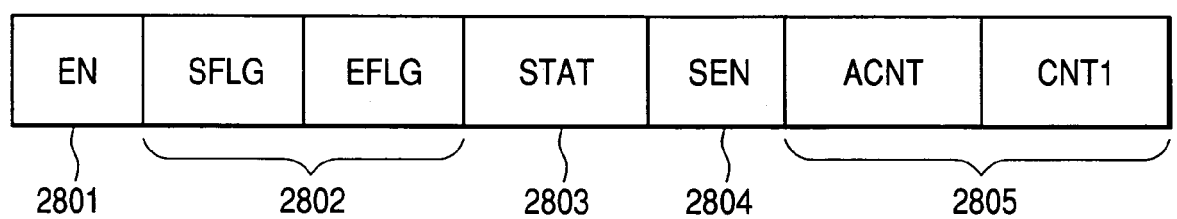
FIG. 28 a structural diagram showing the control/status register of a transmission management module according to an embodiment of the present invention.

The setting register viewed from the CPU 700 and the ALUAE 1202 is a control/status register 2800 shown in FIG. 28. An EN 2801 is a control register representing whether the transmission management is enabled in hardware, or not, and is set from the CPU. The SFLG and EFLG 2802 are flags indicative of start and end of a frame (communication), which are set from the ALUAE 1202, and can be read only from the CPU 2700. The SFLG is set to transmission start 1020 and a one-frame start 2700 of the reception, and is reset when the state transitions described in the items (1) and (2) are ended. The EFLG is set by the transmission end 1023 and a reception one-frame end/reception NG 2701, and is reset when the state transitions described in the items (1) and (2) are ended.

An STAT 2803 indicates the internal state 910 of the transmission management and enables read only. The state shown in FIG. 27 is insufficient depending on the radio communication specification. However, in this example, because it is unnecessary to describe the details of the radio communication specification, only a basic framework is shown. If necessary, the state can be readily added. An SEN 2804 means the next transmission permission/inhibition 907, and is set by the CPU. 1 and 0 are set to the SEN 2804 at the time of permission and inhibition, respectively.

Reference numeral 2805 consisting of an ACNT and a CNT1 indicates the count value of various timers. The ACNT is used by the timer 1 (2711), and the CNT1 is used by the timer 2 (2708). Another counter is required depending on the radio communication specification. If necessary, another counter can be readily added to this basic framework.

As described above, the transmission management 1030 uses the counter for management of the transmission and reception. The counter conducts the count operation even while the ALUAE actually conducts the transmission operation and the reception operation. Accordingly, when the transmission management 1030 is going to be realized by the ALUAE, the ALU cell that constitutes the counter must be always ensured with the result that the efficiency is deteriorated. Under the circumstances, the counter is provided as a dedicated circuit in this embodiment.

5.2 Radio Communication Specific Processing

In this example, a description will be given of the radio communication specific processing 1031, the respective transmission radio communication specific processing 2920 and the reception radio communication specific processing 3120, and their hardware structure and operation, and the setting register. The radio communication specific processing 1031 processes by one bit unit, and therefore conducts processing low in efficiency when the ALUAE that processes by, for example, 16-bit unit is used. When the processing by one bit unit is conducted by a dedicated circuit, the area efficiency is improved more than that when processing is conducted by the ALUAE.

(1) Transmission Radio Communication Specific Processing

Figure 29:
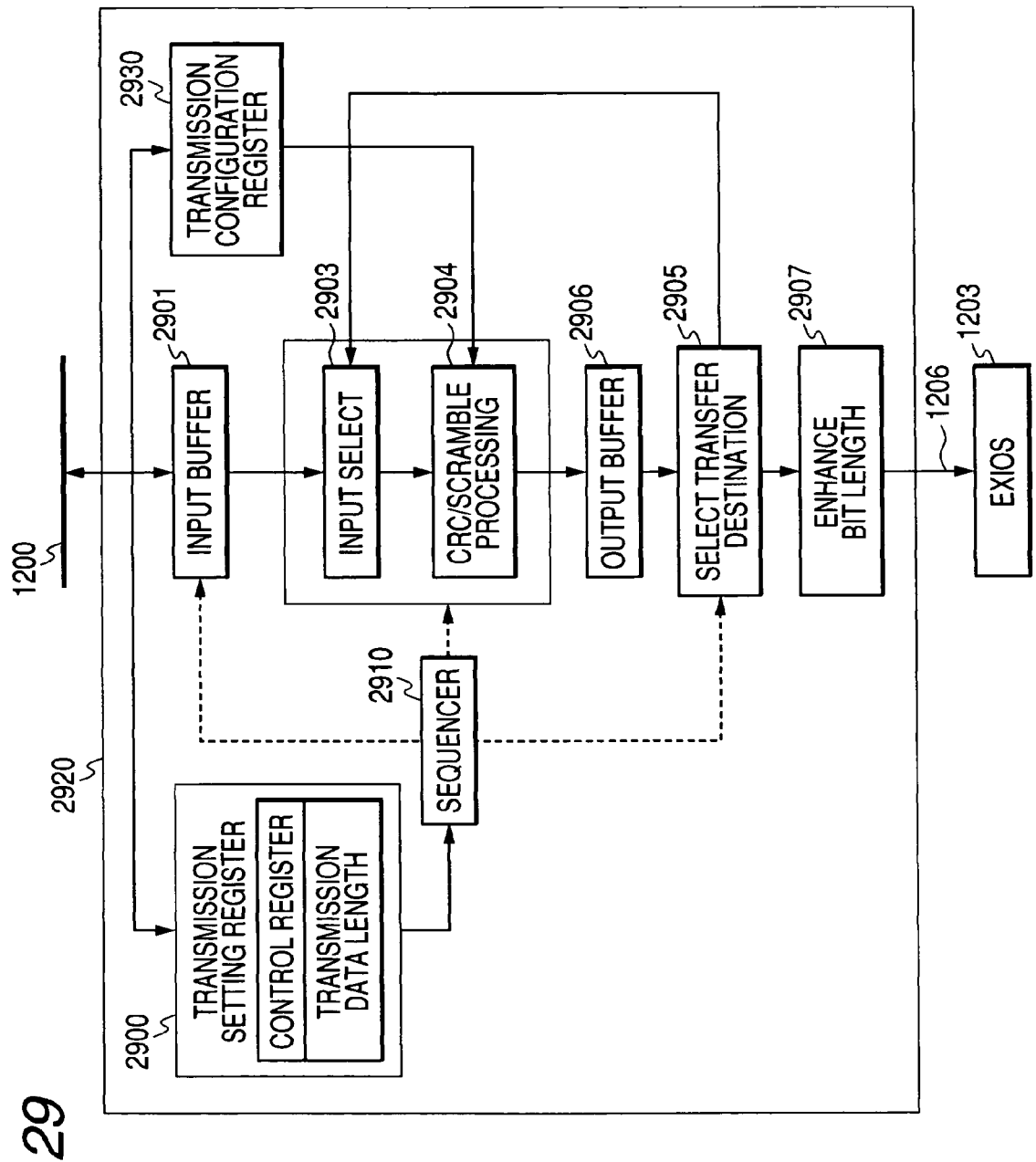
FIG. 29 is a flowchart showing the operation of a radio communication specific processing module at the time of transmission according to an embodiment of the present invention.

In this example, a description will be given of the hardware structure and operation with reference to FIG. 29, and the setting register with reference to FIG. 30, in the transmission radio communication specific processing 2920.

First, the transmission setting register 2900 is initialized by the CPU 700. The transmission register has a control register 3000 and a transmission data length register 3010 shown in FIG. 30.

Figure 30:
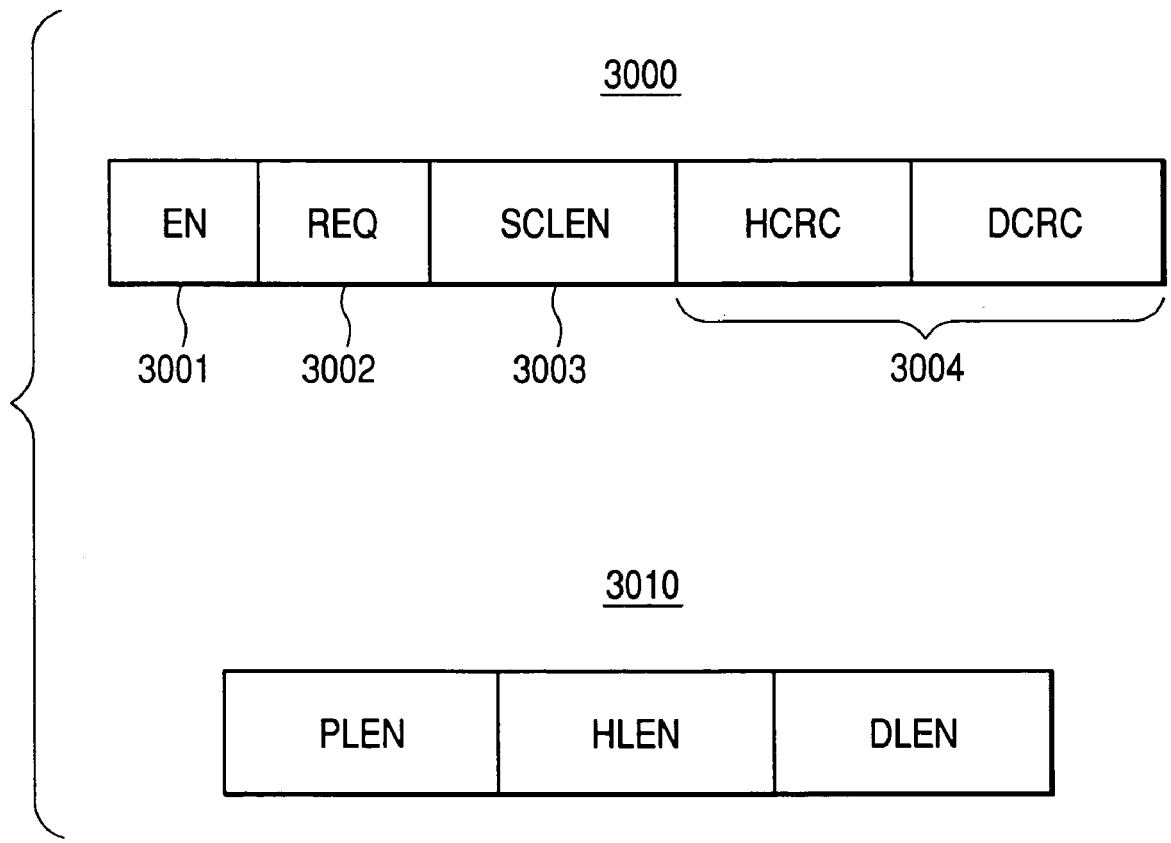
FIG. 30 is a diagram showing a transmission register of the radio communication specific processing module according to an embodiment of the present invention.

The EN 3001 of the control register 3000 shown in FIG. 30 makes the transmission radio communication specific processing 2920 effective in hardware. In this embodiment, the transmission radio communication specific processing 2920 conducts two processing of scramble and CRC. In the data structure 1100 shown in FIG. 11, the CRC processing sets the header 1 (1107), the header 2 (1109), and the data (1110), and adds the respective results as a CRC-H1108 and a CRC-D1111 to provide the format of 1100. The scramble is conducted from the head of all the bits of 1100.

The SCLEN 3003 designates the bit width of the scramble processing. 0 is 7 bit width and 1 is 10 bit width in the initial value. The HCRC and DCRC 3004 designate the bit width of the CRC processing in which 0 is 32 bits, and 1 is 16 bits. The transmission data length register 3010 designates the data length before the original CRC processing and the scramble processing which are sent from the CPU 700 are implemented, in each of the regions. The PLEN designates the bit width of the preamble region 1101, the HLEN designates the bit width of the header 1 1107, and the DELN designates the bit width obtained by adding the header 2 (1109) and the data 1110 in the data region 1103 according to the data structure of 1100. After data is sent from the CPU 700 in the order, the transmission radio communication specific processing 2920 processes the CRC and scramble, and can transfer the results to the ALUAE 1202.

The transmission configuration register 2930 is inputted with a parameter that designates the operation of the scramble and the CRS. Upon completion of the initial setting, the CPU 700 transmits data to an input buffer 2901 in the stated order of the preamble region 1101, the header1 1107, the header2 1109, and the data 1110, and conducts given processing in sequence. The processing subsequent to 2901 will be described. As a flow of processing, the scramble processing is conducted after the CRC processing has been conducted. First, the input buffer is selected by an input selection 2903. In the CRC/Scramble processing 2904, no processing is conducted in the preamble region 1101, and data is outputted to an output buffer 2906. In the header 1 (1107), the CRC processing is implemented by the CRC/Scramble processing 2904 according to the header length that is designated by the HCRC of the transmission data length register 3010 and the operation of the CRC that is designated by the transmission configuration register 2930. A CRC-H is added and outputted to the output buffer 2906. In the header2 (1107) and the data 2 (1110), the CRC processing is implemented by the CRC/Scramble processing 2904 according to the header length that is designated by the DCRC of the transmission data length register 3010 and the operation of the CRC that is designated by the transmission configuration register 2930. A CRC-D is added and outputted to the output buffer 2906.

Then, the input selection 2903 direction is selected by a transferred destination selection 2905, and an input from the transfer destination selection 2905 is selected by the input selection 2903. The scramble processing is implemented on the CRC processed data in the output buffer by the CRC/Scramble processing 2904, and the data is again stored in the output buffer. The designation of the scramble operation is determined by the transmission setting register 2900 and the transmission configuration register 2930. Upon completion of the scramble processing, the transferred destination selection 2905 selects a bit width extend 2907 direction. In the bit width extend 2907, data that is deal with as one bit up to this time is extended to 8 bits by inserting 0 in 7 higher bits according to the ALUAE 1202. Thereafter, the output is conducted through the EXIOS 1203 as needed when there is a request from the ALUAE 1202. The processing within the transmission radio communication specific processing 2920 is controlled by a sequencer 2910.

(2) Reception Radio Communication Specific Processing

Figure 31:
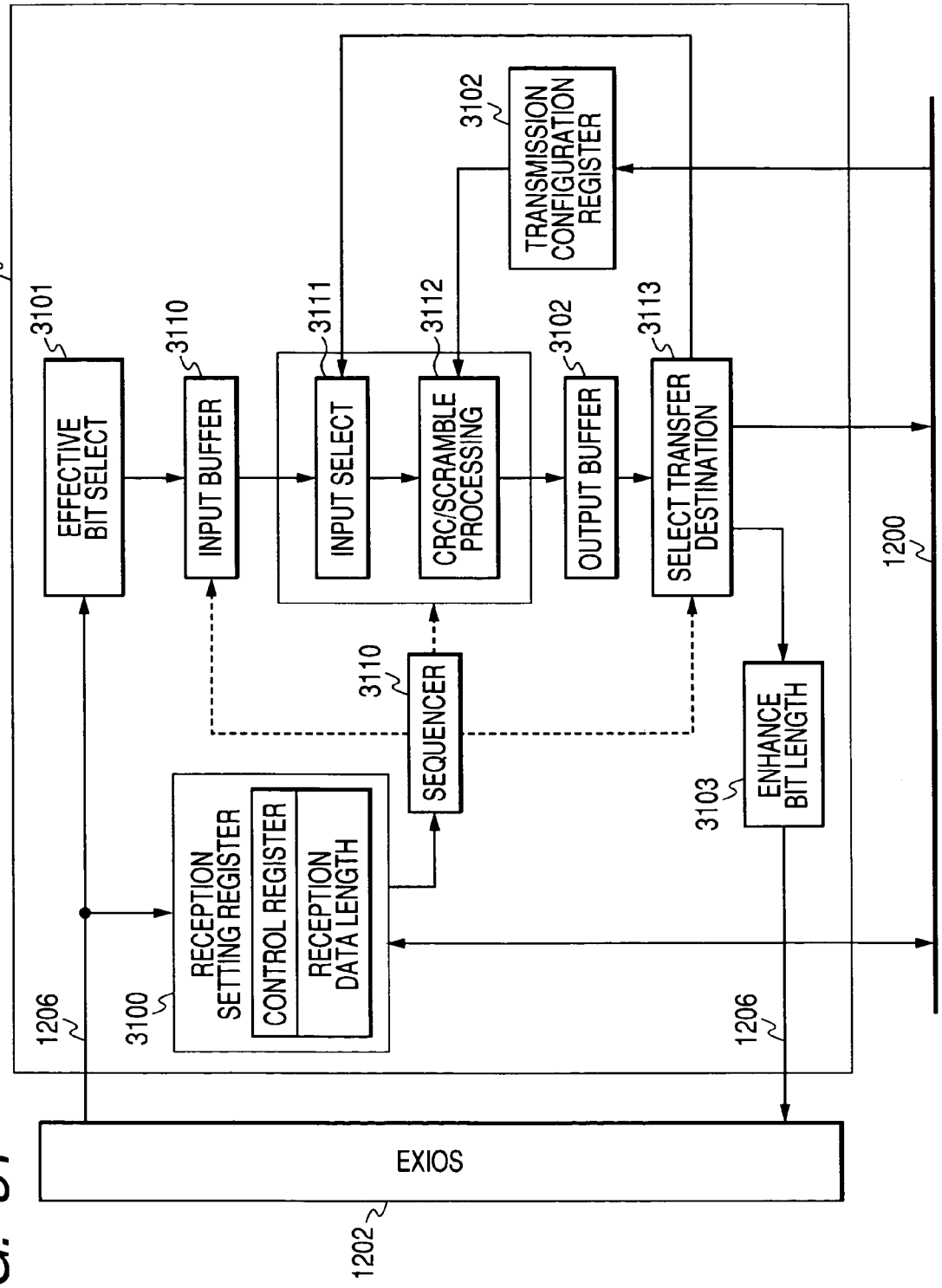
FIG. 31 is a flowchart showing the operation of the radio communication specific processing module at the time of reception according to an embodiment of the present invention.
Figure 32:
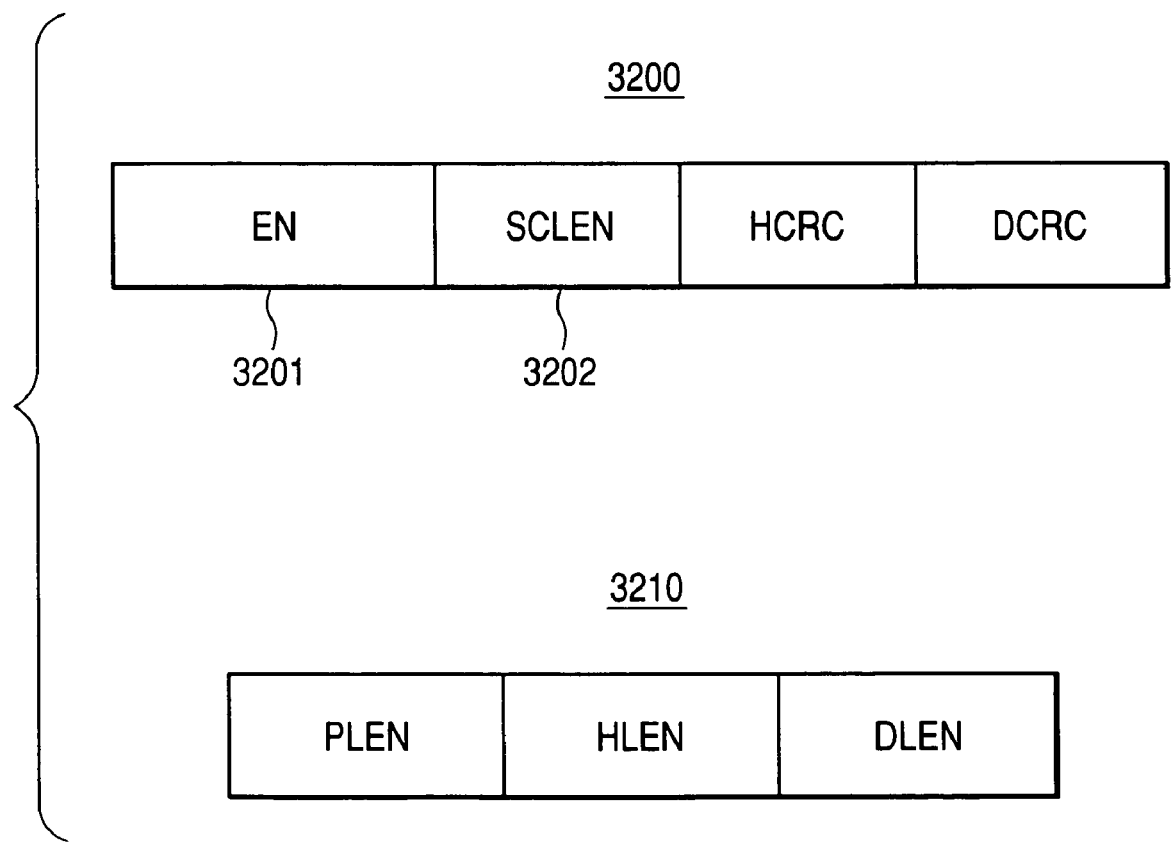
FIG. 32 is a diagram showing a reception register of the radio communication specific processing module according to an embodiment of the present invention.

In this example, a description will be given of the hardware structure and the operation with reference to FIG. 31, and the setting register with reference to FIG. 32, in the reception radio communication specific processing 3120.

First, a reception setting register 3100 is initialized by the CPU 700. The reception setting register 3100 has a control register 3200 and a reception data length register 3210 shown in FIG. 32. An EN 3201 of the control register 3200 makes the reception radio communication specific processing 3120 effective. 1 is effective, and 0 is ineffective. The meanings of other codes will be omitted because the same as 3000 is applicable. In the case of reception, the SYNC used for packet detection in the preamble region is not sent to the reception radio communication specific processing 3210. This is different from the case of transmission. The meaning of the reception data length register 3210 will be also omitted because the same as 3010 is applicable.

Upon completion of the initial setting, when reception starts by the ALUAE 1202, data other than the SYNC 1105 is transmitted to the reception radio communication specific processing 3120, the CRC and the scramble processing are executed, and the results are stored in the output buffer 3113. The results of the header 1 and the results of the CRC are transmitted to the ALUAE 1202 through the EXIOS to conduct the CRC determination. Other data is outputted according to a request from the CPU 700.

As a flow of processing, the SFD 1106 is sent to the reception radio communication specific processing 3120 every time one bit demodulation is ended by the ALUAE 1202. Since the SFD 1106 is sent with the bit width of the ALU at the time of transmission, one lower significant bit is selected by a significant bit selection 3101, and then stored in the input buffer 3110. When the SFD 1106 and the data of the header 1 (1107) are sent, scramble is executed on the data by the CRC/Scramble processing 3112 as needed, and then stored in the output buffer 3102. Those results are outputted to the EXIOS 1202 in response to a request from the ALUAE 1202.

Also, the header 1 (1107) is again inputted to the CRC/Scramble processing 3112 through the transferred destination selection 3113 and the input selection 3111 to calculate the CRC-H1108. The results of the CRC are also stored in the output buffer as with the other results, and are outputted according to a request from the ALUAE 1202. The ALUAE 1202 analyzes a value of the header 1 (1107), and inputs the bit widths of the obtained header 2 (1109) and data to the reception data length register 3210 of the reception setting register 3100. Thereafter, the header 2 (1109) and the data 1110 are inputted, and the scramble and the CRC are calculated by the CRC/Scramble processing 3112, and then stored in the output buffer 3102. The results of the CRC are returned through the EXIOS 1202 according to the request from the ALUAE 1202 to conduct the CRC determination. The header 2 (1109) and the data 1110 are outputted according to the request from the CPU 700. Other portions of the same names as the transmission radio communication specific processing 2920 conduct like operation.

6. Applied Example of DRE 6.1 Realization of Radio Communication Operation Via Radio API A description will be given of the radio API required to realize the radio communication operation by using the DR chip, and a method of realizing the radio communication operation using the radio API. The radio API is executed by the CPU.

6.1.1 Function of Radio API

In order to realize the radio communication operation, nine radio APIs are defined. The nine radio APIs are as follows:

(1) Hardware initialization
(2) Software radio initialization
(3) Start (reception operation start)
(4) Next transmission permission/inhibition
(5) Transmission request
(6) Received data acquirement
(7) ack transmission request
(8) interrupt factor acquirement
(9) transmission management state acquirement Those APIs will be described below.

(1) The hardware initialization initializes the overall structure of the DRE 708 in hardware. A construct having an initialization flag turns on the flag, and other constructs initialize a value of the register, or the like.

(2) The software radio initialization is the initialization of the DRE 708 according to the radio communication specification to be realized. The ALUAE 1202 conducts setting of the configuration data, the interrupt setting, and setting of the state transition table. The WCE 1201 sets the parameter and the timer counter for radio communication processing. The setting of the configuration data in the initialization of the ALUAE 1202 is conducted by storing the configuration data in a buffer of the CNFGC 1309, and storing the configuration data necessary for the ALUA 1305, the LSAR 1304, and the LSAL 1306 by setting the control register 1600. The interrupt setting is conducted by the control register 1500 of the AECTL. The setting example of the state transition table will be described later.

(3) The start (reception start) makes various hardware in the active status from the sleeping status. As a result, the ALUAE 1202 starts the reception operation, and the WCE 1201 can acknowledge various information from the CPU 700 and the ALUAE 1202.

(4) The next transmission permission/inhibition allows the transmission management 1030 to give the next transmission permission or inhibition. This is the determination of the first permission/inhibition from the present status, and the transmission management 1030 conducts the final determination according to the detailed determination of a time measurement due to the timer.

(5) The transmission request issues a transmission request to the ALUAE 1202, and also sends the transmitting data to the transmission radio communication specific processing 2920. The transmission request first refers to a local memory within the ALUAE 1202, and confirms whether the previous transmission has been ended, or not. If not ended, the API returns an error and is ended. If ended, the transmitting data is sent to the transmission radio communication specific processing 2920, and the processing start is set in the transmission setting register. In addition, a flag is raised at a given address of the local memory within the ALUAE 1202 to notify the transmission request.

(6) The received data acquirement is conducted by acquiring the received data from the output buffer 3102 of the reception radio communication specific processing 3120 after receiving a reception end interrupt from the ALUAE 1202.

(7) The ack transmission request is basically identical with the processing of the transmission request. However, because the transmission priority is the highest, when the previous transmission is not ended, the ack transmission request is canceled and the transmission procedure is then conducted as with the transmission request. Also, when the previous transmission is canceled, a value indicative of the cancellation is returned.

(8) The interrupt factor acquirement acquires the interrupt factor from the interrupt that is issued with respect to the CPU 700. More specifically, a value of the interrupt factor register 1512 within the AECTL 1301 is referred to and analyzed to return a value corresponding to the interrupt factor.

(9) The transmission management state acquirement conducts the state acquirement from the transmission management 1030.

6.1.2 A Real Example of Radio Communication Operation.

Figure 33:
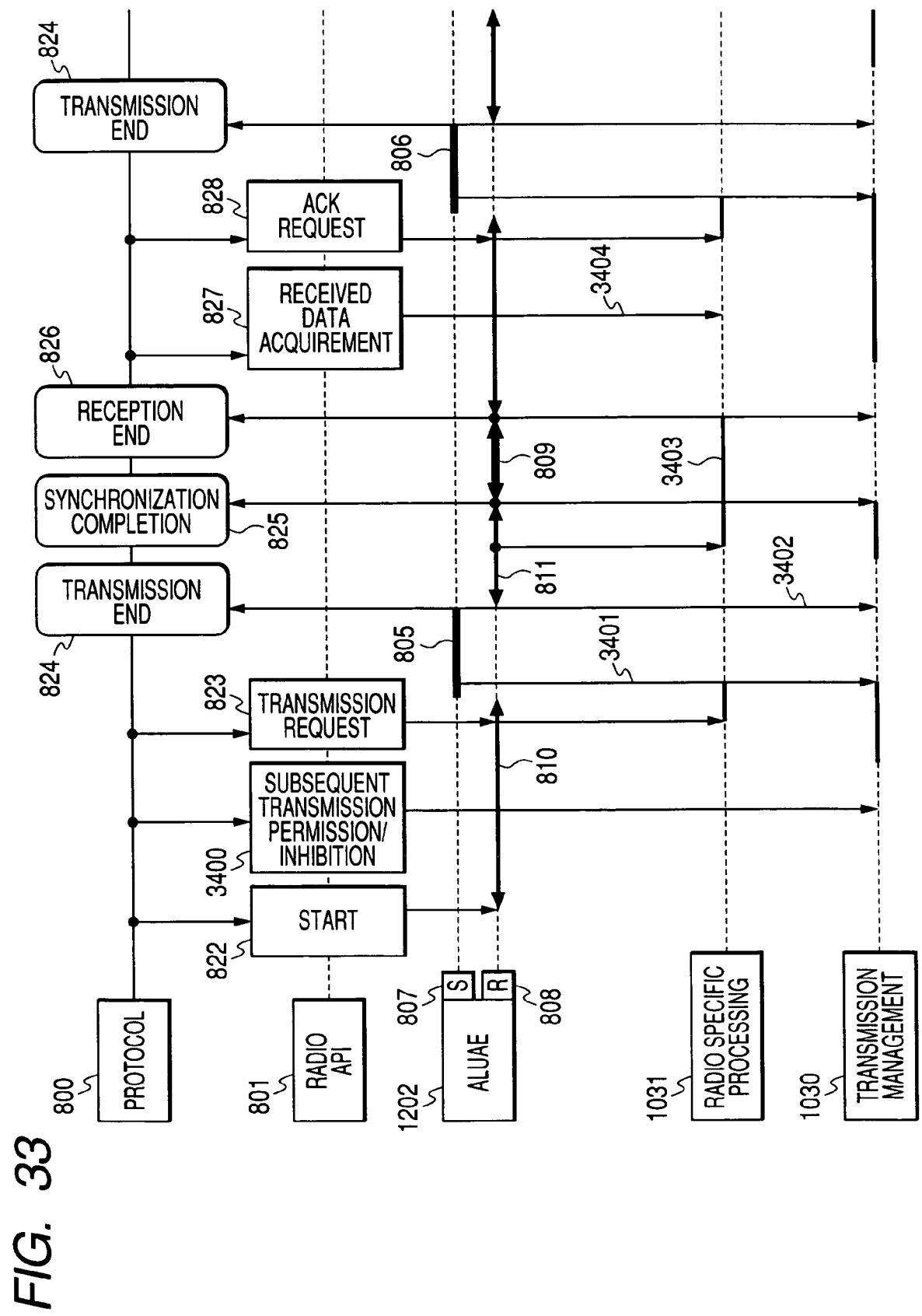
FIG. 33 is a diagram showing a use example of a radio API in a typical operation of the radio communication according to an embodiment of the present invention.

A description will be given of the main operation of an example of the radio communication operation that is realized by the above-mentioned radio API with reference to FIG. 33. In the drawing, the initialization operation is omitted. In the drawing, solid lines indicate "active", dotted lines indicate "sleeping" or "standby", and bold lines indicate operation to be emphasized particularly. More specifically, the transmission management 1030 is indicated by solid lines only in the transmission enable state, and the count by the timer is not particularly indicated in FIG. 33.

First, when the start API 822 is executed, the reception operation R808 of the ALUAE 1202 is started. In this example, the synchronous processing 810 is executed among the received processing. Then, a permission flag SEN 2804 of the control/status register 2800 of the transmission management 1030 is set by the next transmission permission/inhibition API 3400. As a result, the internal state transition of 1030 can be conducted.

Upon issuance of the transmission request API 823, the transmitting data to the radio communication specific processing 1031 is transferred to conduct the scramble and CRC operation. Also, the transmission request flag on the local memory of the ALUAE 1202 is set. When there is no synchronous radio signal in the synchronous processing 810, and the transmission management 1030 is in the transmission enable state, and the transmission request flag is set, the transmission operation 805 due to the ALUAE 1202 is started. The transmission operation is executed by changing the circuit structure of the S1 state processing and the F2 state processing shown in FIG. 10 according to the configuration information. The ALUAE 1202 conducts a transmission start notification 3401 on the transmission management 1030 with the transmission start. Also, upon completion of the transmission, the ALUAE 1202 conducts the transmission end notification 3402 on the transmission management 1030, and executes the transmission end interrupt 824.

After completion of the transmission, the ALUAE 1202 again executes the synchronous operation 811. In the SFD detection during the synchronous operation, the radio communication specific processing 1031 is also used (3403). When the SFD detection is successful, the synchronization completion interrupt 825 is executed, and the demodulation operation 809 of the significant data starts. The received and demodulated data is sent to the radio communication specific processing 1031 to execute the processing of the CRC and scramble, and thereafter is stored in the output buffer. Upon completion of the reception of one packet, the ALUAE 1202 executes the reception end interrupt 826, and notifies the transmission management 1030 of the reception end.

Upon receiving the reception end interrupt 826, the CPU 700 executes the received data acquirement API 827, and acquires the data that has been processed by the radio communication specific processing 1031 (3404). In the case where the reception is completed, and the received data is addressed to the subject station, the ack request API 828 is executed.

The operation of the ack request API 828 is identical with that operation of the transmission request API 17823, and therefore its description will be omitted. After the ACK transmission is conducted in the transmission operation 806, the ALUAE 1202 again starts the reception operation.

6.2 Setting Example of Configuration Transition

In this example, a description will be given of the outline of a setting register for controlling the configuration transition and the internal operation of the AECTL 1301 with reference to a state transition diagram shown in FIG. 34.

6.2.1 Setting Register Related to State Transition

Figure 34:
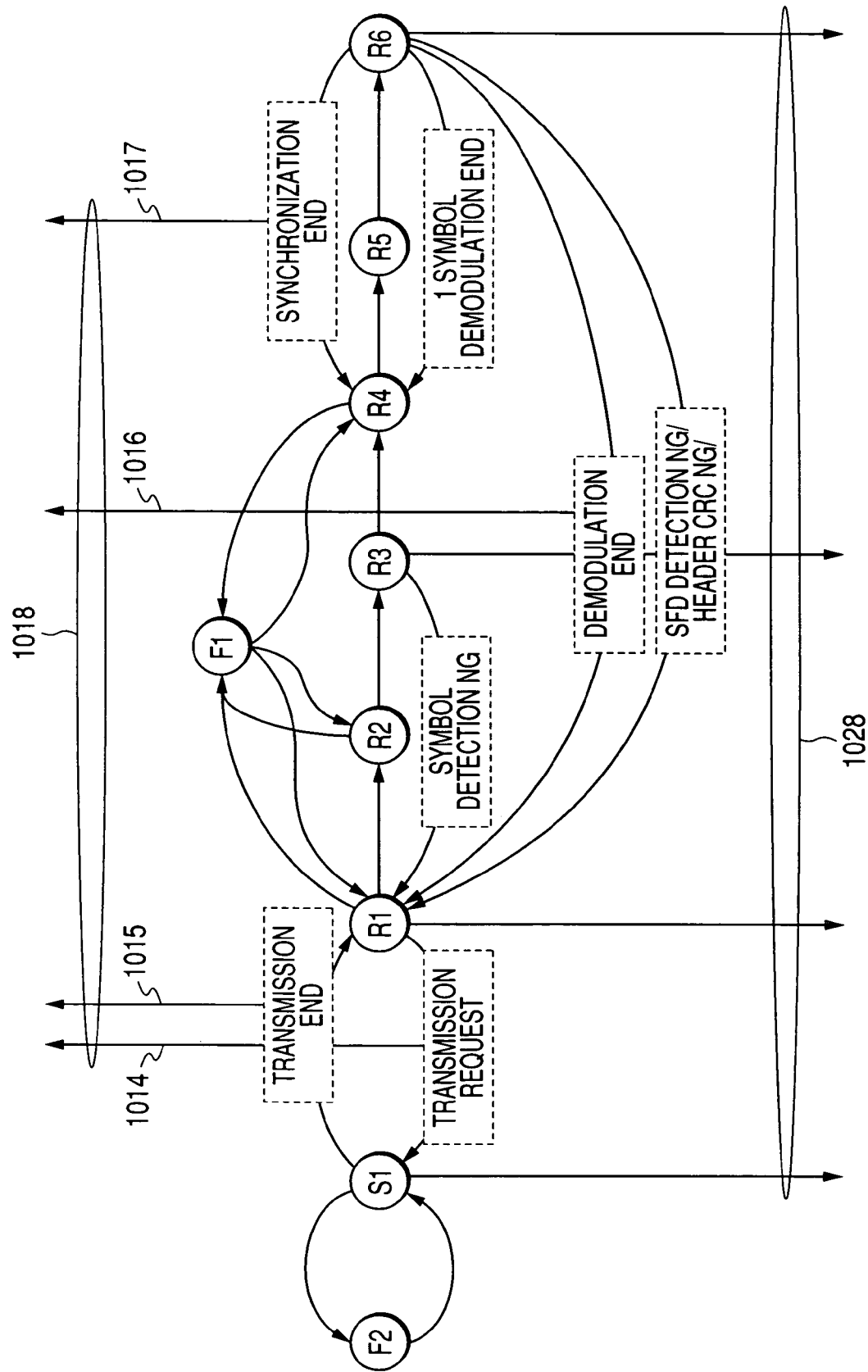
FIG. 34 is a state transition diagram showing the setting operation in a state transition table according to an embodiment of the present invention.

In the state transition diagram of FIG. 34, there are shown two operations that are conducted at the time of determining the transition other than the state transition. One operation is an interrupt 1018 together with the state transition, and another operation is a communication 1028 with the WCE. In the following description, the state transition is set in the state transition table, and interrupt occurs together with the state transition in an item (a), the communication with the WCE is set in an item (b), and there is no interrupt operation in a characteristic setting example of the state transition table system in an item (c).

(a) Setting of State Transition Table

The setting of the state transition table will be described below with reference to FIGS. 34 and 35. The state transition table is a table that sets information for determining the present state and a destination to be next transited in advance in order to autonomously conduct the state transition. The simplest structure has the tables of the number as large as the number of arrows that connect the respective states shown in the state transition diagram of FIG. 34. In this example, a method of reducing the table will be described.

The state transition diagram shown in FIG. 34 is distinguished by the next transited state (transited state), and then classified by the presence or absence of interrupt as shown in FIG. 35. Even if plural present states exist, if the transited state is identical, the state transition can be defined by the same state transition control register 2600. However, it is necessary to distinguish whether there is an interrupt, or not. As a result of the above distinctions, the transition states can be expressed by 13 state transition control registers of 3500 to 3512. However, the transition state is distinguished by a value of the trigger signal when there are transitions of from one present state to plural states.

In the items of the trigger signal, there are shown what value is outputted from what trigger signal among the four ALU cells of lower right (LR), the lower left (LL), the upper right (UR), and the upper left (UL). Those signals are joined together from the highest bit in the order of the LR, LL, UR and UL, and determined as a trigger signal of 32 bits. A numeric value that is set to the trigger signal is described in the notation system of base 16. Locations where 1 is described are all 0. With the table structured above, for example, because plural state transitions can be collectively managed in the table as with the transition 3504 or 3505, the table can be reduced in size. An allocation example of the trigger signal shown in FIG. 35 in correspondence with the state transition shown in FIG. 34 will be described below.

First, in the transition 3500, because R1 is the present state, the transitions 3505 and 3511 having R1 as the present state must be distinguished by a trigger signal. Because the output of the upper left cell becomes a trigger signal in those transitions, H01, H02, and H04 different in the bit position of 1 are allocated to those transitions. Then, in the transition 3501, F2 is the present state. Although there is no channel having F2 as the present state, the transitions 3504, 3505, and 3508 that do not depend on the present state need to be distinguished by the trigger signal in the transitions distinguished by the outputs of the upper right cell. As a result, H01, H02, H04, and H08, and codes different in the bit position of 1 are allocated to those four transitions.

Thirdly, although the transition 3502 needs to be distinguished from the transition 3511 because S1 is the present state, there occurs the above problem because the positions at which the trigger signal is outputted are different from each other. As with the transition 3501, the transitions 3504, 3505, and 3508 need to be distinguished from each other. Under the circumstances, H10 is allocated to the transition 3502. In this example, there is no problem even if the transition 3502 has the same trigger signal as that of the transition 3501, but different trigger signals are set for facilitation of understanding. Other trigger signals can be determined in the same manner. FIG. 36B shows the setting of the state transition table corresponding to FIG. 35. FIG. 36A is a table in which Nos. are allocated to the respective states. In FIG. 36B, NSTAT indicates the state of transited destination, CSTAT is the present state, CMSK is a mask indicating whether the present state is included in the state transition condition, or not, INTE is a setting whether interrupt is executed at the time of transition, or not, and ^EMSK is a value that bit-reverses a mask given to the MSK 2409 of the EXIOS. In this example, the INTE of the interrupt setting corresponds to the SIRQ of the interrupt control register 1510, which is described here supportively of the table for convenience of description.

In the above process, the trigger signal determination conditions are strictly described. However, in the case where there are the margin of the number of bits in the trigger signal, and the margin of the state transition table, the state transition control register 2600 is allocated to the respective transitions with the result that the setting can be eased.

(b) Setting of Communication with WCE

In order to notify the transmission management 1030 of the one-frame start or end status, the ALUAE 1202 writes in the WCE 1206 through the LS cell and the EXIOS. More specifically, a flag is raised in the SFLG or the EFLG of the control/status register 2800 of the transmission management 1030.

In order to access to the external of the ALUAE 1202 by the LS cell, the LS/PP bit 2202 of the configuration register 2200 of the LS cell is set to 0, and a PP mode is selected. Then, the configuration registers 2500 and 2510 of the EXIOS instruct that a port to be used is connected to the wiring 1206, to thereby enable an access. What register within the WCE 1201 is accessed is designated by an address given from the ALUAE 1202.

(c) Setting of State Transition Table in the Case of No Interrupt Operation

In this example, in the case where there is no interrupt operation included in FIG. 34, that is, in the case where only the state transition purely occurs, this embodiment is effective in the reduction in the table capacity of the state transition table. The conclusion is that the state transition can be expressed by only the state transition control registers 2600 of the number as large as that of the states. Because the number of registers as large as the number of state transitions is usually required, this is a mask effect made by the trigger signal and the MSK 2409.

FIG. 37 shows setting of the state transition table in the case where there is no interrupt. In FIG. 36B, as a result of setting the transition 3500 having 1 set to the INTE to 0, for example, the transitions 3500 and 3501 have the same destination to be transited, and the present states can be out of the transition conditions. Similarly, because the state transitions having the same destination to be transited can be expressed by one state transition control register 2600, the state transitions can be expressed by nine state transition control registers 2600 in total, that is, the state transition control registers 2600 of the number as large as that of the states. In the expression, the ^EMSK indicative of the trigger signal sets all the bit positions of 1 differently, and can discriminate the transition by only the trigger signal. However, in the transition different in the present state, because the trigger signal can be identical, it is possible to reduce the number of bits of the trigger signal.

6.2.2 Summary of Method of Realizing AECTL

Figure 38:
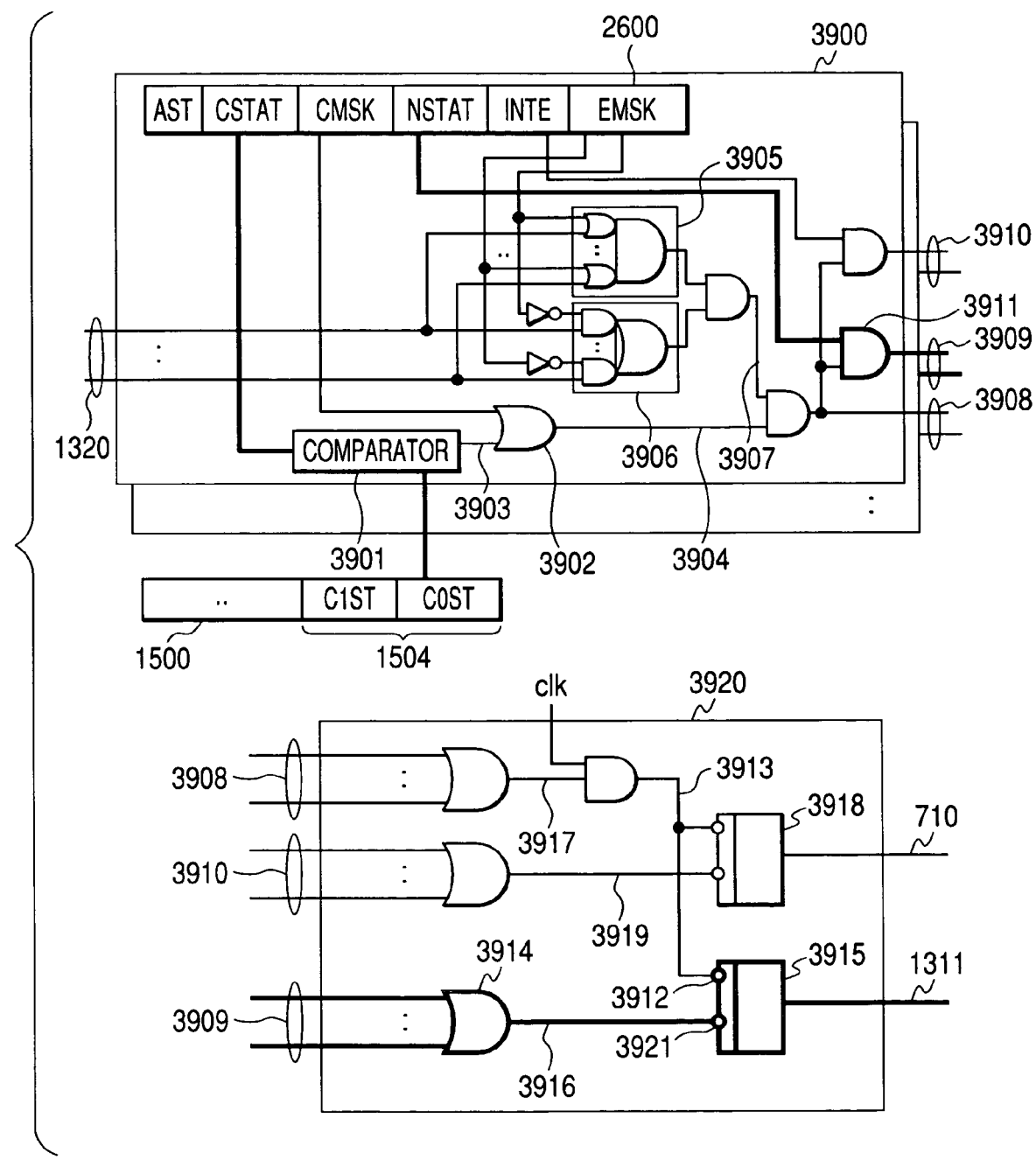
FIG. 38 is a diagram showing the internal operation of the AECTL according to an embodiment of the present invention.

In this example, an example of a logic diagram that realizes the internal operation of the AECTL 1301 is shown in FIG. 38, and the summary of the realizing method will be described.

The AECTL 1301 is divided into two blocks. A first block is indicated by reference numeral 3900 which determines the condition set by the state transition control register 2600. The number of blocks exists as large as the number of state transition control registers 2600. In fact, the blocks 3900 exist in each of the clusters, but only one cluster is representatively shown in this example. A second block is indicated by reference numeral 3920, and inputs the outputs from the plural blocks 3900, and outputs a signal 1311 indicative of a next state and an interrupt request signal 710 to the external module of the AECTL 1301. The respective blocks will be described below.

(a) Transition Condition Determination Block The block 3900 inputs the trigger signal 1330 after data is masked with the MSK 2409 of the EXIOS 1203, and determines the transition condition in each of the transition channels. In the block 3900, bold lines indicate a bundle of signal lines consisting of plural bits, and a comparator 3901 that inputs the bold line compares the plural bits with each other, and an AND logic 3911 represents the assembly of the AND logics of the respective bits.

First, a logic that determines the present state will be described. The present state is determined by the comparator 3901 that determines whether the present state is identical with the designation made by the CSTAT, or not, and an OR logic 3902 of the CMSK representing whether the present state is included in the condition, or not. When the CMSK is 1, the condition is met without any limit. The determination of the comparator 3901 determines whether the CSTAT designation of the channel register is identical with the present state 1504, or not, and obtains the results 3904. In the block 3900, since the details of the respective clusters will be omitted, the COST of 1504 is representatively inputted. The comparator outputs 1 when the comparison results are identical, and 0 when the comparison results are not identical, to 3903.

Then, a logic that determines the condition of whether the trigger signal is established, or not will be described. The logics of 3905 and 3906 realize the determination. The trigger signal determination is conducted by determining that bits that are not masked with the EMSK are all 1. In 3905, the determination of whether the EMSK is raised or the trigger signal is 1 in all of the bits. In 3906, it is determined whether the trigger signal bit is 1, or not, in at least one of bits where the EMSK is not raised. When the AND logic of 3905 and 3906 is taken, the EMSK is 0 and the trigger signal is effective in at least one bit, and it can be determined as a signal 3907 that those significant bits are all 1.

Finally, it is determined whether the channel is significant, or not, by the AND logic of 3904 and 3907. The determination results of all the channels are outputted as a signal 3908. In the respective channels, the logic that outputs a next state is obtained by a signal 3909 as ANDing a significance determination signal 3908 and the NSTATs of the respective channels. If not significant, all of the bits are 0, and if significant, the NSTAT is outputted. The interrupt permission signal in each of the channels is outputted as a signal 3910 by the AND logic of the significance determination signal 3908 and the INTE in each of the channels.

(b) Output Signal Generation Block 3920 from AECTL

The signals 3908, 3909, and 3910 generated in each of the channels are inputted to an output signal generation block 3920 of the AECTL, and outputted as the next state signal 1311 of the configuration and the interrupt request signal 710. The signal 1311 is outputted to the ALU array 1305, the LS array <1304•1306>, the IOP 1308, and the EXIOS 1203, and the signal 710 is outputted to the INTC 706. A logic that generates 1311 and 710 will be described below.

First, a logic that generates the next state signal 1311 is indicated by a lower half of 3920, which will be described below. The logic is made assuming that only one channel is significant. That the plural channels are significant is in error in the user setting of the state transition control register 2600, and an error check is necessary, which will be omitted in this description. The error check can be readily conducted by checking that the significance determination signal 3908 in each of the channels is not 1 with respect to the plural channels. Also, bold lines within 3920 indicate a bundle of signal lines as with that within 3900, an OR logic 3914 that inputs the bold line indicates an assembly of the OR logic of the single bits, and a flip flop group 3915 indicates an assembly of the flip flops of the plural bits.

Under the above assumption, the significant determination signal 3908 and the next state signal 3910 in each of the channels are 0 except for the significant channel. For that reason, the flip flop group 3915 that outputs the next state signal 1311 sets a result 3917 of ORing in all of the channels of 3918 as an enable signal, and sets a result 3916 of the OR logic in all of the channels of 3918 as a next state signal. Because the flip flop group is synchronous in clock, a result 3913 of the AND logic of an enable signal 3917 and the clk is inputted to an enable terminal 3912. A next state signal 3916 is inputted to an input terminal 3921, and when the clock clk becomes significant, the result is outputted as the next state signal 1311.

Then, a logic of generating the interrupt request signal 710 will be described according to the upper half of 3920. A logic that generates 710 is made assuming that only one channel is significant as with 1311. A flip flop 3918 inputs the same signal 3913 as 1311 to the enable terminal. As with 1311, the input signal inputs a result 3919 of the OR logic of all the channels of the interrupt permission signal 3910 in each of the channels, and when the clock clk becomes significant, the result is outputted as the interrupt request signal 710.

In the above description, the embodiment of the software radio is exemplified. However, the setting example of the configuration according to the present invention is not limited to the radio communication, but is variously applicable.

7. Applied Example of Radio API that Cancels Transmission

Figure 39:
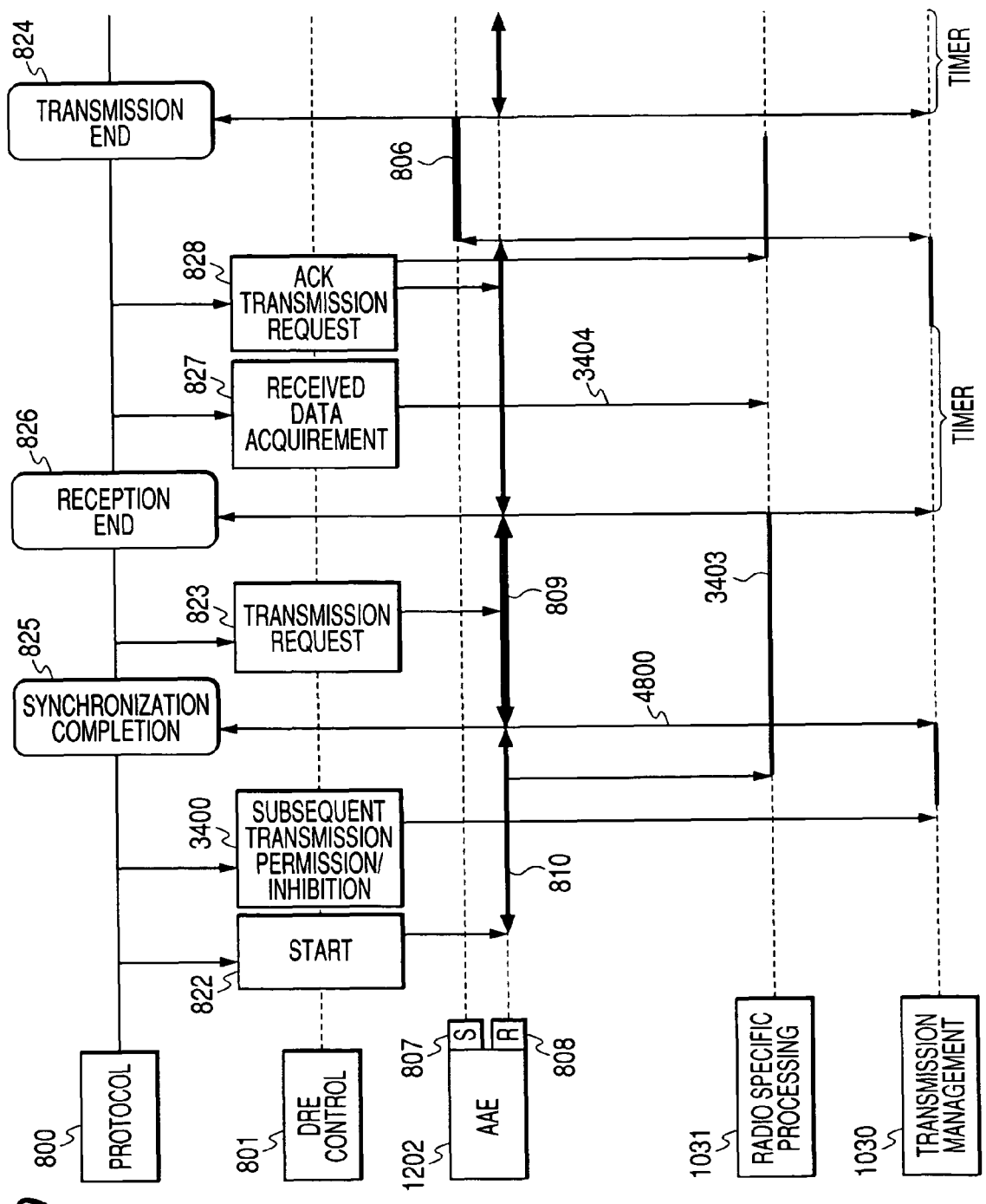
FIG. 39 is a diagram showing a use example of the radio API that cancels transmission in the radio communication operation according to an embodiment of the present invention.

In the radio communication operation, an example of the radio API application in the case of canceling the transmission request will be described with reference to FIG. 39. In the drawing, initialization operation is omitted. Various control/status registers and buffers and the local memories 21602 are mapped with addresses, and can be accessed from the CPU 700. In the drawing, solid lines indicate "active", dotted lines is "sleeping", and bold lines are operation to be particularly emphasized.

First, when the start API 822 is issued, the reception operation R 808 of the ALUAE (AVE) 1202 is started (810). Then, a permission flag SEN 2804 of the control/status register 2800 of the transmission management 1030 is turned on by the next transmission permission/inhibition API 3400. As a result, the internal state of 1030 is transited to the transmission enable state.

Thereafter, although there is no reception for a while, because the reception operation S807 continues to conduct the SFD detection, the reception operation is conducted in hardware (811). In the SFD detection, the radio communication specific processing 1031 also operates (3403). Upon completion of synchronization, the reception operation 810 requests the interrupt 825 of the synchronization completion notification. Also, the reception operation 810 executes a set 4800 of the flags indicative of synchronization end on the transmission management 1030. In addition, the ALUAE 1202 is transited to the reception operation 809 of the significant data.

Then, although the transmission request API 823 is executed, because the ALUAE 1202 is during the reception operation 809, the transmission is not immediately conducted, and the transmission data and transmission flag are set on the radio communication specific processing 1031 circuit and the ALUAE 1202, respectively. Upon completion of the receiving operation 809 of the significant data, the ALUAE conducts the transmission end notification on the transmission management 1030 by 3402, and requests the transmission end interrupt 824. A received data acquirement API 827 is issued with the completion of the reception, and the data processed in the radio communication specific processing 1031 is acquired (3404).

The CPU analyzes the received packet, and starts the ack request API 828 if there is a packet for the subject CPU. In this situation, because the ack transmission is conducted in priority, the previous transmission request 823 is canceled. In the case where the received packet is not for the subject CPU, the transmission request 823 is not canceled. The operation of the ack request API 828 is identical with the operation of the transmission request API 823, and therefore its description will be omitted. After the ACK transmission is conducted by 826, The ALUAE 1202 again starts the reception operation.

The present invention has been described with reference to the embodiments, but can be variously modified within a scope that does not deviate from the subject matter of the present invention.

What is claimed is:

1. A semiconductor integrated circuit comprising:

a host processor;

an interrupt controller that provides a notice of an interrupt request to the host processor; and a reconfigurable circuit a cell array structure and a switch control unit, wherein the cell array structure comprises a plurality of cells which perform an arithmetic processing, wherein the switch control unit controls a plurality of states of the reconfigurable circuit and includes a state transition table, and the reconfigurable circuit cooperating with the host processor, wherein the state transition table comprises a plurality of channels, wherein each of the plurality of channels has first information indicating a state of the reconfigurable circuit and second information designating whether the notice of the interrupt request is sent together with the first information to the host processor, wherein when the plurality of cells send information regarding switching a configuration of the plurality of cells, which comprises a processing function, and a transfer direction of the data to the switch control unit, the switch control unit selects one of the plurality of channels and sends information regarding the next state of the reconfigurable circuit to the plurality of cells, which is included in the selected one of the plurality of channels, and wherein when the selected one of the plurality of channels has the second information which designates that the notice of the interrupt request is sent, the reconfigurable circuit sends the notice of the interrupt request to the interrupt controller and the interrupt controller provides the notice of the interrupt request to the host processor.

2. The semiconductor integrated circuit according to claim 1, wherein the state transition table expresses both of an expression that a present state of the cell array structure coincides with a designated state, and the signal of the switch instruction coincides with data stored in the state transition table as a switch condition, and an expression that the signal of the switch instruction coincides with the data stored in the state transition table, regardless of the present state of the cell array as the switch condition.

3. The semiconductor integrated circuit according to claim 1, wherein the state transition table has an information indicative of whether or not the notice of an interrupt request is output to the host processor at the time of transition.

4. The semiconductor integrated circuit according to claim 1,
wherein a signal transmission from the cell array and a notification of a switching condition to the switch control unit is conducted by using a command for conducting processing and data transfer by the cell.

5. A semiconductor integrated circuit comprising:
a reconfigurable circuit including a cell array structure that holds a plurality of cells which conduct processing, and a switch control unit for switching over structural information including processing functions of the cells and data transfer directions between the cells,
wherein the switch control unit has a state transition table having a plurality of transition channels,
wherein each of the plurality of transition channels has first information indicating structural information of a transited channel, second information indicating structural information of a transiting channel, and third information indicating whether information of the transiting channel is necessary to decide the next structural information,
wherein if the third information included in a selected transition channel of the plurality of transition channels indicates the information of the transiting channel is not necessary, the switch control unit sends the first information regardless of the second information, and
wherein if the third information included in the selected transition channel indicates the information of the transiting channel is necessary, the switch control unit sends the first information included in the channel haying the second information indicating the present structural information.

6. The semiconductor integrated circuit according to claim 5, wherein the semiconductor integrated circuit further comprises a CPU that controls the reconfigurable circuit, and wherein each of the plurality of transition channels further has fourth information indicative of whether the CPU receives notice of interrupt at the time of transition, or not.

* * * * *